US012691498B2

(12) United States Patent
Kopp et al.

(10) Patent No.: US 12,691,498 B2
(45) Date of Patent: Jul. 28, 2026

(54) METHOD AND APPARATUS FOR ADDITIVE MANUFACTURING OF A COMPONENT, AND COMPONENT MANUFACTURED IN ACCORDANCE WITH THE METHOD

(71) Applicants: BLZ Bayerisches Laserzentrum Gemeinnützige Forschungsgesellschaft mbH, Erlangen (DE); Friedrich-Alexander-Universität Erlangen-Nürnberg, Erlangen (DE)

(72) Inventors: Sebastian-Paul Kopp, Fürth (DE); Björn Düsenberg, Herzogenaurach (DE); Andreas Bück, Gommern (DE); Michael Schmidt, Erlangen (DE)

(73) Assignees: BLZ Bayerisches Laserzentrum Gemeinnützige Forschungsgesellschaft mbH, Erlangen (DE); Friedrich-Alexander-Universität Erlangen-Nürnberg, Erlangen (DE)

( * ) Notice: Subject to any disclaimer, the term of this patent is extended or adjusted under 35 U.S.C. 154(b) by 0 days.

(21) Appl. No.: 18/703,553

(22) PCT Filed: Oct. 6, 2022

(86) PCT No.: PCT/EP2022/077825
§ 371 (c)(1),
(2) Date: Apr. 22, 2024

(87) PCT Pub. No.: WO2023/066674
PCT Pub. Date: Apr. 27, 2023

(65) Prior Publication Data
US 2026/0001134 A1     Jan. 1, 2026

(30) Foreign Application Priority Data
Oct. 21, 2021   (DE) ..................... 10 2021 211 871.2
Aug. 24, 2022   (DE) ..................... 10 2022 208 741.0

(51) Int. Cl.
*B22F 10/37*      (2021.01)
*B22F 10/85*      (2021.01)
(Continued)

(52) U.S. Cl.
CPC .............. *B22F 10/37* (2021.01); *B22F 10/85* (2021.01); *B22F 12/13* (2021.01); *B22F 12/50* (2021.01);
(Continued)

(58) Field of Classification Search
CPC ............................ G03G 15/224; B29C 64/165
(Continued)

(56) References Cited

U.S. PATENT DOCUMENTS 6,066,285 A * 5/2000 Kumar ................... B33Y 30/00
                                                                      264/603
6,376,148 B1 * 4/2002 Liu ......................... B29C 64/40
                                                                      156/273.1
(Continued)

FOREIGN PATENT DOCUMENTS

DE       112015004226 T5      6/2017
DE       102019119113 A1      1/2021
(Continued)

OTHER PUBLICATIONS

Kopp et al., Electrophotographic 3D printing of pharmaceutical films, Additive Manufacturing, vol. 73, Jul. 5, 2023, 103707.*
(Continued)

*Primary Examiner* — Yung-Sheng M Tsui
(74) *Attorney, Agent, or Firm* — FisherBroyles, LLP; Roger L. Browdy; Ronni S. Jillions

(57) ABSTRACT
A method and an apparatus for additive manufacturing of a component are described. At least one powder is provided. A plurality of component layers of the component to be manufactured are produced, wherein at least one powder
(Continued)

fraction of the at least one powder is deposited to produce a component layer by electrostatically charging the powder fraction, electrostatically charging a deposition unit at least in some regions and picking up the electrostatically charged powder fractions by means of the deposition unit, which is electrostatically charged at least in some regions, and transferring it to a deposition surface. Various powder fractions to be deposited to produce the component layers are electrostatically charged with different polarity.

23 Claims, 10 Drawing Sheets

(51) Int. Cl.

| | |
|---|---|
| *B22F 12/13* | (2021.01) |
| *B22F 12/50* | (2021.01) |
| *B22F 12/90* | (2021.01) |
| *B28B 1/00* | (2006.01) |
| *B28B 13/02* | (2006.01) |
| *B28B 17/00* | (2006.01) |
| *B29C 64/141* | (2017.01) |
| *B29C 64/295* | (2017.01) |
| *B29C 64/321* | (2017.01) |
| *B29C 64/393* | (2017.01) |
| *B33Y 10/00* | (2015.01) |
| *B33Y 30/00* | (2015.01) |
| *B33Y 40/10* | (2020.01) |
| *B33Y 50/02* | (2015.01) |
| *B33Y 80/00* | (2015.01) |

(52) U.S. Cl.
CPC .............. *B22F 12/90* (2021.01); *B28B 1/001* (2013.01); *B28B 13/02* (2013.01); *B28B 17/0081* (2013.01); *B29C 64/141* (2017.08); *B29C 64/295* (2017.08); *B29C 64/321* (2017.08); *B29C 64/393* (2017.08); *B33Y 10/00* (2014.12); *B33Y 30/00* (2014.12); *B33Y 40/10* (2020.01); *B33Y 50/02* (2014.12); *B33Y 80/00* (2014.12); *B22F 2998/10* (2013.01)

(58) Field of Classification Search
USPC ....................................................... 264/484
See application file for complete search history.

(56) References Cited

U.S. PATENT DOCUMENTS

| | | | | |
|---|---|---|---|---|
| 8,124,192 | B2 | 2/2012 | Paasche et al. | |
| 9,885,987 | B2 | 2/2018 | Chillscyzn et al. | |
| 10,647,104 | B2 | 5/2020 | Kobayashi et al. | |
| 10,882,301 | B2 | 1/2021 | Baecker | |
| 2004/0197487 | A1* | 10/2004 | Aoki | G03G 15/224 427/458 |
| 2013/0077997 | A1* | 3/2013 | Hanson | G03G 15/24 399/130 |
| 2014/0167326 | A1* | 6/2014 | Jones | G03G 15/224 264/447 |
| 2018/0141126 | A1* | 5/2018 | Buller | B29C 64/153 |
| 2019/0134706 | A1* | 5/2019 | Shafir | G03G 15/0194 |
| 2021/0291445 | A1 | 9/2021 | Coward | |
| 2022/0145213 | A1 | 5/2022 | Bachmann | |
| 2023/0109613 | A1 | 4/2023 | Mathea | |

FOREIGN PATENT DOCUMENTS

| | | |
|---|---|---|
| DE | 102020001068 A1 | 8/2021 |
| WO | 2012164015 A1 | 12/2012 |

OTHER PUBLICATIONS

KOPP, Sebastian-Paul et al. "Investigation of the electrophotographic powder deposition through a transfer grid for efficient additive manufacturing", 11th CIRP Conference on Photonic Technologies [LANE 2020] on Sep. 7-10, 2020, pp. 122-127.

Kruth, J. et al. (2005), "Binding mechanisms in selective laser sintering and se- lective laser melting", Rapid Prototyping Journal, vol. 11 No. 1, pp. 26-36.

Stichel, T. et al. (2014), Powder Layer Preparation Using Vibration-controlled Capillary Steel Nozzles for Additive Manufacturing, Physics Procedia, vol. 56, pp. 157-166.

Kumar, A. V., Dutta, A. (2003), Investigation of an electrophotography based rapid prototyping technology, Rapid Prototyping Journal, vol. 9(2), pp. 95-103.

Kumar, A. V., Dutta, A., Fay, J. E. (2004), "Electrophotographic printing of part and binder powders", Rapid Prototyping Journal, vol. 10, pp. 7-13.

Stichel, T. et al. (2020), „Electrophotographic Multilayer Powder Pattern Depo-sition for Additive Manufacturing JOM, vol. 72, pp. 1366-1375.

Kopp, S.-P. et al. (2020) Investigation of the electrophotographic powder dep-osition through a transfer grid for efficient additive manufacturing, Procedia CIRP, vol. 94, pp. 122-127.

* cited by examiner

METHOD AND APPARATUS FOR ADDITIVE MANUFACTURING OF A COMPONENT, AND COMPONENT MANUFACTURED IN ACCORDANCE WITH THE METHOD

CROSS-REFERENCES TO RELATED APPLICATIONS

This application claims the priority, under 35 U.S.C. § 119, of German Patent Application, Serial No. DE 10 2021 211 871.2, filed Oct. 21, 2021, and German Patent Application, Serial No. DE 10 2022 208 741.0, filed Aug. 24, 2022, the content of which is incorporated herein by reference in its entirety as if fully set forth herein.

FIELD

The invention relates to a method and an apparatus for additive manufacturing of a component and a component manufactured in accordance with the method.

BACKGROUND

Various methods for powder deposition are known in additive manufacturing. Electrophotographic powder deposition has advantages over other deposition mechanisms, particularly in terms of powder consumption and process times. For electrophotographic powder deposition, the powders to be processed are electrostatically charged. This leads to the accumulation of charges in the component to be manufactured.

SUMMARY

It is an object of the present invention to improve a method for additive manufacturing, in particular to avoid charge accumulation during powder deposition.

This object is achieved by a method comprising the steps set forth hereinafter. At least one powder is provided. A plurality of component layers of a component to be manufactured are produced, wherein at least one powder fraction of the at least one powder is deposited to produce a component layer. To deposit a powder fraction, the powder fraction is electrostatically charged, a deposition unit is electrostatically charged at least in some regions and the electrostatically charged powder fraction is picked up by means of the deposition unit, which is electrostatically charged at least in some regions, and transferred to a deposition surface. Various powder fractions to be deposited to produce the component layers are electrostatically charged with different polarity.

According to the invention, it has been recognized that charging different powder fractions with different polarity reduces charge accumulation in the component layers produced. This improves the powder deposition of further powder fractions. Advantageously, electrostatic repulsion between different powder fractions and between the powder particles is reduced. The number of component layers that can be produced on top of each other is not limited due to a successive increase in charge accumulation. In particular, the powder deposition is supported by the electrostatic attraction of powder fractions charged with different polarities. Additional powder fractions can also be deposited with greater accuracy and higher packing density. As a result, the density and porosity of the manufactured component can be specifically adjusted. The overall design freedom in the manufacture of the component is increased. In particular, the component can be manufactured with a high density and low porosity. As a result, components with improved mechanical properties can be achieved.

It is particularly preferable for the powder fractions used to create different component layers to be electrostatically charged with different polarities. This leads to an additional force of attraction between the successively deposited powder fractions and component layers. The component layers produced are additionally stabilized.

Preferably, several different powders are provided. When producing the component layers, powder fractions of different powders can be used to combine different materials in the component. For example, different component layers can be produced from powder fractions of different materials. It is also possible to combine different materials in one component layer. For example, several powder fractions of different powders can be deposited sequentially to produce a component layer. Preferably, the powder fractions to be combined in a component layer are charged with the same polarity.

The at least one powder can be a polymer powder, a metal powder and/or a ceramic powder. Polymer powders and/or ceramic powders directly electrostatically chargeable. Dielectric components can be added to metallic powders for electrostatic charging. For example, metallic powders can have a coating of a dielectric material. The at least one powder can have further components, for example binders and/or additives. Suitable additives are, in particular, flow aids and/or charge control agents. Charge control agents can support charging of the powder, in particular triboelectric charging of the powder.

The method is particularly suitable for multi-material processing. By providing various powders, the process can be used to combine various materials integrally into one component. The result is a one-piece component that consists of different materials in some regions. Subsequent joining of prefabricated components made of different materials is not necessary. For example, a combination of different commercially available materials, in particular commercially available polymer materials, is possible. It is particularly advantageous to combine materials with very different properties, in particular with very different mechanical and/or thermal properties, for example with very different melting temperatures. This makes it possible to manufacture components with specifically adjustable, in particular locally adjustable, properties.

The electrostatic charging of the powder fractions can take place by means of the triboelectric effect and/or gas discharge. Charging based on the principle of gas discharge can be carried out in particular with a corona wire and/or a scorotron. A scorotron, also known as a corona grid, has proven to be particularly suitable as it enables the electrical acceleration field for the ions generated by means of gas discharge to be controlled. This enables a more precise adjustment of the desired surface potential of the powder layer to be charged. To generate different polarities, a powder charging unit can have a reversible voltage source. In particular, a corona wire and/or a scorotron can be energized with electrical voltage of different polarity by means of the reversible voltage source.

The deposition unit can be electrostatically charged at least in some regions, in particular selectively. This enables selective powder deposition. Electrophotographic methods have proven to be particularly suitable for electrostatic charging in some regions, in particular selectively. For example, the deposition unit has a photoconductive layer, in particular a layer of arsenic (III) selenide ($As_2 Se_3$). A photoconductive layer is dielectric, but becomes conductive in the exposed region when exposed to suitable radiation. This is known as the photoelectric effect. The photoconductive layer of the deposition unit is also referred to below as the photoconductor layer. The photoconductive layer can be electrostatically charged by gas discharge, in particular with the aid of a corona wire and/or a scorotron. By selectively exposing individual regions of the electrostatically charged photoconductive layer, the exposed regions can be selectively discharged. The exposure is carried out using a light-emitting diode, for example. In the case of a photoconductive layer made of arsenic(III) selenide, exposure at a wavelength of around 613 nm has proven to be particularly suitable.

To pick up the electrostatically charged powder fraction, the powder particles of the powder fraction are electrostatically attracted by the deposition unit, which is electrostatically charged at least in some regions. Depending on the relative polarity of the charge of the deposition unit and the powder fraction, the powder particles adhere in electrostatically charged regions or in selectively discharged regions of the deposition unit, in particular a photoconductive layer of the deposition unit. The electrostatic charging of the powder fraction and picking up the electrostatically charged powder fraction by means of the deposition unit is also referred to as the developing step.

To support picking up the electrostatically charged powder fraction, the deposition unit preferably has a conductive base body. The base body can be made of aluminum, for example. The conductive base body of the deposition unit can be subjected to a pick-up voltage that favors the attraction and adhesion of the powder fraction. The pick-up voltage has a polarity opposite to the charge of the powder fraction. The deposition unit preferably has a reversible deposition unit voltage source. By means of the reversible deposition unit voltage source, the deposition unit, in particular its base body, can be subjected to a pick-up voltage with a polarity opposite to the respective charge of the powder fractions. The magnitude and polarity of the pick-up voltage can be specifically adapted to the powder fraction to be picked up, in particular to the mass of the powder particles and/or their electrostatic charge.

The powder fraction picked up by the deposition unit is transferred to a deposition surface. The transfer to the deposition surface comprises in particular a transfer of the deposition unit with the adhering powder fraction into an installation space and a depositing of the powder fraction onto the deposition surface. The transfer of the powder fraction, in particular the depositing of the powder fraction, onto the deposition surface is also referred to as a printing step. The deposition surface is the surface on which the powder fraction is to be deposited to produce the respective component layer. For the first component layer, this can in particular be an installation platform of the installation space and/or a substrate on which the component is to be produced. For further component layers, the deposition surface is formed by the previously produced component layer.

For transfer into the installation space, the deposition unit can be displaceable, in particular translationally displaceable. Preferably, the deposition unit can be displaced in at least two translational degrees of freedom, in particular in the direction of a surface normal of the deposition surface and in a direction perpendicular thereto. This enables simple and precise displacement of the deposition unit with the powder fraction adhering to it into the installation space and simple and precise positioning relative to the deposition surface. The positioning of the deposition unit in the direction of the surface normals of the deposition surface can, in particular, be dependent on a component height that has already been produced. Preferably, a distance between the deposition unit and the deposition surface can be adjusted independently of the component layers that have already been produced. The deposition unit can be arranged on a positioning system for displacement, for example. For example, a linear axis and a precision lifting table have proven to be suitable for the translational movement and positioning relative to the installation space or the deposition surface.

Preferably, the adhesion of the powder fraction to the deposition unit, in particular during transfer into the installation space, is supported by a holding voltage applied to the deposition unit, in particular its base body. In particular, the holding voltage can correspond to the pick-up voltage. The holding voltage can be generated, for example, with the aid of the deposition unit voltage source.

Preferably, the deposition unit, in particular its base body, can be subjected to a deposition voltage. The deposition voltage preferably has the same polarity as the electrostatic charge of the powder fraction to be transferred. The deposition voltage helps to deposit the powder fraction onto the deposition surface. The deposition voltage can be generated, for example, by means of the deposition unit voltage source. To deposit the powder fraction, the polarity of the deposition unit voltage source can advantageously be reversed in order to switch from a holding voltage to the deposition voltage.

The powder fraction transferred to the deposition surface is preferably solidified to produce the respective component layer. For example, the deposited powder fraction can be thermally solidified. For this purpose, the powder fraction or a component of the powder fraction, for example a binder, can be melted. Thermal solidification is particularly suitable for processing polymer powders. The installation space can be heated for melting, in particular by means of heating jets and/or lasers. The powder fraction or at least one component thereof can also be melted selectively, for example by electron beam melting and/or selective laser sintering. Solidification can also be achieved using alternative methods, such as binder jetting. This enables solidification without melting the powder, which is particularly advantageous in the case of high-melting powders, for example metallic and/or ceramic powders.

By producing the component layers layer by layer, the component can be completed as a whole. However, further manufacturing steps, in particular post-processing steps, can also be provided after the layer-by-layer production of the component layers. For example, the layer-by-layer production of the component layers can produce a green part, from which the component is finished by means of suitable post-processing steps. Particularly in the event that the deposited powder fractions are not or not completely solidified, the component layers can be further solidified in a post-processing step after the layer-by-layer production of the component layers, to finalize the component. For example, a previously produced green part can be debinded and/or sintered.

After the deposition of a powder fraction, any electrostatic charges still present at the deposition unit, in particular its photoconductive layer, are cancelled. For this purpose, the photoconductive layer of the deposition unit can be fully exposed.

According to a preferred aspect of the method, the powder fractions to be deposited to produce successive component layers are electrostatically charged with alternating polarity. The alternating electrostatic charging of the powder fractions of successive component layers leads to a particularly advantageous deposition behavior. The alternating electrostatic attraction of the layers favors powder deposition. The component layers produced are particularly stable. Charge accumulations are effectively avoided.

It is also possible to produce several component layers before the polarity of the powder fractions to be deposited is changed. It has been found that an accumulation of charge in the component can also be compensated for by increasing the deposition voltage. In particular, it is possible to increase the deposition voltage until the dielectric strength of already produced component layers and a medium, in particular air, in the gap between the uppermost component layer (deposition surface) and the deposition unit is reached. For an exemplary air gap with a gap dimension of 1 mm, the maximum voltage difference is approximately ±3000 V, for example.

If several component layers are produced with powders of the same polarity, the surface potential of the deposition surface increases. The inventors have recognized that good deposition results can be achieved up to a limit surface potential of the deposition surface with unchanged polarity of the powder fraction to be deposited. If the amount of the surface potential of the deposition surface exceeds the limit surface potential, the polarity of the next powder fraction to be deposited can be changed. A suitable limit surface potential is, for example, around 1000 V. This allows the number of component layers that are successively deposited with the same polarity to be increased, for example to 2 to 5 component layers.

According to a preferred aspect of the method, a surface potential of the deposition surface is measured in order to determine the polarity of the powder fraction to be deposited next. The measurement can be used to reliably determine the polarity of the next powder fraction to be deposited. For example, the next powder fraction can be charged with different polarity. It is also possible to compare an amount of the measured surface potential with a limit surface potential. If the limit surface potential is exceeded, the polarity of the powder fractions to be deposited can be changed. It is also possible to change the polarity of the powder fraction to be deposited if there is otherwise a risk of the limit surface potential being exceeded.

According to a preferred aspect of the method, the pick-up and/or transfer of the electrostatically charged powder fraction by means of the deposition unit is contactless. The contactless deposition process reliably prevents contamination and/or damage to the deposition unit, in particular its photoconductor layer. In particular, the risk of powder fractions melted in the installation space adhering to the deposition unit is reduced. The contactless transfer, in particular the contactless deposition, of the powder fraction on the deposition surface is favored by the reduced charge accumulation according to the invention. This applies in particular when charging the powder fractions to be deposited to produce successive component layers with alternating polarity, as their attraction supports the transfer to the deposition surface.

According to a preferred aspect of the method, the powder fraction is preheated at the deposition unit. Preheating the powder fraction enables the temperature of the powder fraction to be adapted to the temperature in the installation space. Thermal shocks are avoided. This minimizes adverse effects, such as thermal stresses in the component to be manufactured. Particularly when processing polymer powders, premature partial crystallization of the powder within the component to be manufactured and the resulting component distortion, known as curling, are avoided.

The preheating of the powder fraction at the deposition unit can be carried out in particular by means of a temperature control unit of the deposition unit. The temperature control unit of the deposition unit enables the powder to be preheated during the transfer into the installation space independently of other components of the manufacturing apparatus. Suitable temperature control units can, for example, have fluid channels for a heat transfer fluid, in particular a heat transfer oil. The fluid channels are formed, for example, in a base body of the deposition unit and preferably run in a meandering manner. The fluid channels are particularly preferably arranged in such a manner that they enable uniform heating of the deposition unit, in particular of a photoconductive layer of the deposition unit. The temperature control unit preferably has a temperature control device for heating the heat transfer fluid to a desired temperature and/or a pump for circulating the heat transfer fluid in the fluid channels. Additionally or alternatively, the temperature control unit may have heating wires and/or Peltier elements.

Preheating the powder fraction to be deposited at the deposition unit also has the advantage that cooling of the uppermost component layer in the installation space is reduced, in particular avoided. In addition, effects that can arise during powder deposition due to brief shading of heating devices in the installation space, for example infrared radiators, are reduced.

Preheating the powder fraction to be deposited at the deposition unit also has the advantage that only the powder fraction to be deposited is preheated. Compared to squeegee or roller-based coating systems, there is therefore no need for lengthy heating of the system, which can sometimes take several hours. In particular, there is no need to heat up all the powder provided, for example in a powder bed. This increases the efficiency of the process.

A heating temperature to which the deposition unit is heated to preheat the powder fraction can preferably be selected depending on the quantity and material composition of the powder to be deposited. In particular for polymer powders, for example semi-crystalline polymer powders, a heating temperature has proven to be practicable that is 1° C. to 5° C. above a temperature T to which the powder fraction is to be preheated.

Further heating of the powder fraction can take place in the installation space, for example by means of heating radiation and/or lasers.

According to a preferred aspect of the method, the powder fraction is preheated at the deposition unit to a temperature T for which the following applies: $TS-\Delta T \leq T < TS$, wherein TS is a melting temperature, in particular the onset melting temperature, of the powder fraction and $\Delta T$ is 30° C., in particular 15° C., in particular 10° C., in particular 5° C. The powder fraction is heated at the deposition unit to a temperature just below the melting temperature TS. The melting temperature TS of the powder fraction is understood here and in the following to mean the lowest temperature at which at least one component of the powder fraction begins to melt. Preheating below the melting temperature ensures that the powder fraction and its constituents do not melt on the deposition unit. Contamination and/or damage to the deposition units due to melting residues is avoided. Preheating to just below the melting temperature also allows the powder temperature to be largely adapted to the temperatures prevailing in the installation space. Adverse thermal effects are reliably avoided.

In particular, the melting temperature TS can be an onset melting temperature of the powder fraction. This reliably prevents the powder fraction from melting on the deposition unit. The onset melting temperature is the temperature at which the powder material starts to melt when it is heated. The onset melting temperature can be determined in particular by means of differential scanning calorimetry (DSC).

According to a preferred aspect of the method, the powder fraction is preheated at the deposition unit to a temperature T for which the following applies: $TR-\delta T<T$, wherein TR is a recrystallization temperature, in particular the onset recrystallization temperature, of the powder fraction and $\delta T$ is 20° C., in particular 15° C., in particular 10° C., in particular 5° C., in particular 0° C. This has the advantage, in particular for (partially) crystalline powder materials, in particular partially crystalline polymers, that recrystallization of the powder fraction and thus distortion of the construction material during the deposition process is avoided. Preferably, preheating is carried out to a temperature T above the recrystallization temperature TR, in particular the onset recrystallization temperature ($\delta T=0°$ C.). However, it has been shown that preheating to temperatures T slightly below the recrystallization temperature, in particular of the onset recrystallization temperature ($\delta T>0°$ C.), also prevents recrystallization sufficiently reliably.

The recrystallization temperature TR is preferably the onset recrystallization temperature. This prevents recrystallization of the powder material particularly reliably. The onset recrystallization temperature is the temperature at which recrystallization of the powder material begins when the powder material is cooled. The onset recrystallization temperature can be determined in particular by means of differential scanning calorimetry (DSC).

Preferably, the powder fraction is preheated at the deposition unit to a temperature T for which the following applies: $TR-\delta T<T<TS$, wherein $\delta T$ is 20° C., in particular 15° C., in particular 10° C., in particular 5° C., preferably 0° C. The temperature range between the recrystallization temperature TR, in particular the onset recrystallization temperature, and the melting temperature TS, in particular the onset melting temperature, is also referred to as the quasi-isothermal process window. This temperature range has proven to be particularly favorable for processing (partially) crystalline materials, in particular partially crystalline polymers. Negative effects of recrystallization, such as component distortion, and melting of the powder fraction on the deposition unit are reliably avoided.

The quasi-isothermal process window is highly dependent on the material. For polyamide 12 (PA12), for example, it is between approximately 158° C. and approximately 181° C. For polyamide 11 (PA11), for example, the quasi-isothermal process window is between approximately 164° C. and approximately 199° C. In addition, the quasi-isothermal process window can have deviations due to different additives, for example with flow aids and/or optical scattering particles, and/or starting materials. This can, for example, lead to manufacturer-dependent deviations in the quasi-isothermal process window. Preferably, the quasi-isothermal process window can be determined in advance by a calibration measurement, in particular by means of differential scanning calorimetry (DSC).

According to a preferred aspect of the method, the deposition surface, in particular an entire installation space, is preheated to a temperature T2 for which the following applies: $TR<T2$, in particular $TR<T2<TS$. Preferably, the installation space is kept at a temperature T2 that lies within the quasi-isothermal process window during the deposition of all powder fractions. The temperature T2 preferably corresponds essentially to the temperature T to which the powder fraction is preheated at the deposition unit. A temperature shock during powder deposition is avoided. In particular, a cooling process of the component to be manufactured can be controlled in a targeted manner. Preferably, cooling below the recrystallization temperature TR, in particular below the onset recrystallization temperature, only takes place after the deposition of all component layers. This prevents premature recrystallization. The cooling process can take place in a controlled manner. Particularly advantageously, this makes it possible to specifically influence the crystallization of the construction material and thus the crystallinity, in particular the size of the crystals (so-called spherulites) of the component to be manufactured. This allows the mechanical properties of the component to be manufactured to be influenced in a particularly precise and targeted manner.

According to a preferred aspect of the method, the deposition unit is mechanically excited, in particular vibrated, to transfer the powder fraction to the deposition surface. The mechanical excitation enables a particularly effective and targeted transfer of the powder fraction to the deposition surface. The mechanical excitation overcomes the inertia of the powder particles adhering to the deposition unit. The mechanical excitation increases the distances between individual powder particles, which reduces both the interparticle forces of attraction due to van der Waals interactions and the electrostatic forces of attraction. Mechanical excitation can be achieved by strongly accelerating the deposition unit, in particular by means of the positioning system. Mechanical excitation using an actuator, in particular a piezo actuator, has proven to be particularly suitable. A piezo actuator can be used to generate particularly efficient excitation patterns, in particular vibrations. For example, a periodic voltage can be applied to the piezo actuator to generate a vibration. Sinusoidal, rectangular and/or triangular voltages and combinations of these are suitable, for example. The excitation frequency can be between 100 Hz and 20 kHz, for example. Excitation frequencies in the frequency ranges 100 Hz to 500 Hz, 1 kHz to 2 kHz and/or 10 kHz to 18 kHz are particularly suitable. The peak-to-peak voltage of the excitation can be between 300 and 500 volts, for example. Excitation by means of a pulse sequence consisting of a strong pre-pulse and irregular subsequent pulses with a smaller amplitude has proven to be particularly advantageous. The pre-pulse can, for example, have a peak-to-peak voltage of approximately 1,000 volts. For mechanical excitation, in particular for vibration excitation, several corresponding pulse sequences consisting of a strong pre-pulse and weaker subsequent pulses can be used.

Periodic excitation patterns, in particular sinusoidal excitation patterns, with an excitation frequency in the range of one of the natural frequencies of the deposition unit have proven to be particularly suitable. Preferably, the excitation frequency essentially corresponds to one of the natural frequencies of the deposition unit. This allows particularly high accelerations of the deposition unit to be achieved, which favors overcoming the van der Waals forces.

Preferably, the excitation takes place in such a manner that the deposition unit is essentially accelerated in the direction of deposition. The acceleration in the direction of deposition supports the deposition of the powder particles. In contrast, acceleration perpendicular to the direction of deposition can lead to lateral displacement of individual deposited powder particles (so-called false prints). Strong excitation amplitudes, in particular periodic excitations occurring at a natural frequency of the deposition unit, can lead to strong accelerations in the direction of deposition and/or perpendicular thereto. This can increase powder transfer while at the same time increasing the false print rate.

The mechanical excitation, in particular a periodic excitation with one of the natural frequencies of the deposition unit, is combined with an electrical transfer field, in particular with a deposition voltage. It has been shown that the combination of mechanical excitation and electrical transfer field particularly favors powder deposition. In addition, the electrical transfer field reduces the false print rate. The combination of mechanical excitation and electrical transfer field ensures powder deposition with high coverage of the deposition surface and a low false print rate at the same time. For example, mechanical excitation and switching on of the electrical transfer field are essentially simultaneous.

According to a preferred aspect of the method, the deposition unit is mechanically excited after the electrical transfer field has been fully established. The mechanical excitation does not take place until the electrical transfer field is fully established. Preferably, the mechanical excitation takes place immediately after the transfer field has been fully established. In particular, the power supply, in particular the high-voltage supply, for the electrical transfer field is activated first. Once the electrical transfer field has been fully established, the mechanical excitation, in particular at least one piezo actuator, is then activated. This ensures particularly precise powder deposition in the direction of deposition. For example, common high-voltage supplies can establish suitable deposition voltages (for example between ±500 V and ±3,000 V) within approximately 0.1 s to approximately 30 s. The mechanical excitation should then only take place after the respective time required to establish the transfer field has elapsed.

According to a preferred aspect of the method, an electric transfer field is generated between the deposition unit and a transfer structure to transfer the powder fraction to the deposition surface. The electrical transfer field ensures a particularly targeted and precisely positioned transfer, in particular deposition, of the powder fraction on the deposition surface. The electrical transfer field is preferably generated between a conductive base body of the deposition unit and a grounded transfer structure. For this purpose, the deposition unit, in particular its base body, can be subjected to a deposition voltage.

The transfer structure is preferably grounded. The transfer structure can be arranged in the direction of a surface normal of the deposition surface between the deposition surface and the deposition unit. Preferably, the transfer structure can be displaceable in the direction of the surface normal of the deposition surface in order to precisely adjust the electrical transfer field independently of a height of the component layers already produced.

The transfer structure preferably has a transfer frame made of conductive material. The transfer frame can, for example, be made of conductors arranged in a frame, in particular copper rods. Preferably, the transfer frame has a greater extension in the direction perpendicular to the surface normal of the deposition surface than the deposition unit. The transfer frame preferably has an extension in a plane perpendicular to the surface normal of the deposition surface that exceeds the extension of the deposition unit, for example by 1 mm. In the direction perpendicular to the surface normal of the deposition surface, the transfer frame is preferably arranged around the circumference of the deposition unit. The transfer frames do not hinder the transfer of the powder fraction. Lateral deflection of the powder during deposition is minimized.

According to a preferred aspect of the method, at least two different powders are provided, wherein the at least two different powders are triboelectrically chargeable with two different polarities. The use of such powders makes it easy to charge the powder fractions with different polarities using the triboelectric effect. For example, a powder charging unit used to charge the powders can have a magnetic brush system. This allows the respective powders to be electrostatically charged with different polarities. Various ones of the powders provided can be used to deposit powder fractions charged with different polarities.

The at least two powders can, for example, have different charge control agents, which lead to different polarities in the electrostatic charge with otherwise identical powder properties. In this manner, charging with different polarities and otherwise unchanged powder properties is possible.

Particularly suitable powders for triboelectric charging and their production are described below. The production of the powders and the corresponding powder formulation are an independent aspect of the invention, which is in particular independent of the charging of different powder fractions with different polarities. The powder formulation comprises polymer particles and charge control agents. Suitable charge control agents are in particular functionalized silica particles. In particular, the polymer particles are coated with the charge control agents, in particular the functionalized silica particles. Preferably, the powder formulation consists of polymer particles coated with functionalized silica particles.

To produce a preferred powder formulation, polymer particles are coated with silica particles, in particular dry-coated. Any mixer suitable for dry coating can be used for this purpose, for example shaker mixers, in particular 3D shaker mixers, horizontal and/or vertical mixers, in particular with different agitator geometries, drum mixers, cube mixers and/or cylinder mixers. This ensures a high degree of flexibility in the production of the powder formulation. In addition, mixing aids, for example in spherical form, can be used. The mixing aids can, for example, be made of glass and/or zirconium oxide, in particular glass spheres. Suitable glass spheres can have an average diameter of 1.5 mm and an average weight of 180 g. Mixing aids favor deagglomeration of the silica particles and can be easily separated by sieving after the mixing process.

The polymer particles can consist of any polymers. In particular, the powder formulation can comprise commercially available powders that are coated with the functionalized silica particles. The powder formulation and its production are suitable in an advantageous manner for functionalizing any polymer powder for triboelectric charging in additive manufacturing. Exemplary polymers are polypropylene (PP), polyethylene (PE), polylactide (PLA), polybutylene terephthalate (PBT), polyethylene terephthalate (PET), polymethyl methacrylate (PMMA), polyamide (PA), polycarbonate (PC), polystyrene (PS), polyoxymethylene (POM), polyetheretherketone (PEEK), polyetherketone (PEK), polyphenylene sulphide (PPS), polyether sulfone (PES), acrylonitrile-butadiene-styrene (ABS) and/or acrylonitrile-butadiene-styrene copolymers. In particular, the polymer powders can also consist of mixtures, blends and/or composites of such polymers.

The polymer particles preferably have a particle size distribution in the range from 1 μm to 200 μm.

The functionalized silica particles preferably have an average particle size between 10 nm and 60 nm. The functionalized silica particles serve as charge control agents.

They act as electron acceptors or electron donors and thus ensure a targeted shift in the charge spectrum as part of the powder formulation. Another advantage is that the functionalized silica particles act as a flow aid, which improves the material feed for powder deposition.

Functionalized silica particles in the form of hexamethyldisilazane (HMDS), polydimethylsiloxane (PDMS) or a mixture thereof are particularly suitable for producing a powder formulation for triboelectric charging with negative polarity. For the production of a powder formulation for triboelectric charging with positive polarity, functionalized silica particles in the form of PDMS, nitrogen compounds —$NR_2$ and —$NR_3$ and/or mixtures thereof have proven to be particularly suitable. Suitable functionalized silica particles are commercially available, for example under the trade name "HDK" by Wacker Chemie AG. HDK H05TX, for example, can be used for negative charging. HDK H05TA, for example, can be used for positive charging.

The proportion of charge control agents, in particular the functionalized silica particles, in the powder formulation is in particular in the range between 0.05% and 1% by weight relative to the mass of the polymer. Such a proportion of charge control agents results in a particularly suitable shift in the charge spectrum.

As the inventors have discovered, a particular advantage of triboelectric charging is the homogeneous, in particular complete, charging of the powder particles due to the charge separation. In contrast to gas discharge, which can only be used to charge very thin powder layers, triboelectric charging can be used to charge larger powder layers. As a result, the thickness of the powder layer picked up by the deposition unit can be increased. This enables the deposition of component layers with a greater layer thickness and therefore faster manufacture. For example, triboelectric charging can be used to produce layer thicknesses of the powder fraction to be deposited that correspond to between approximately 1 and approximately 5 average particle diameters of the powder particles of the powder fraction. Depending on the particle diameter, for example, layer thicknesses between approximately 60 μm and approximately 300 μm can be produced. The gas discharge allows for layer thicknesses of approximately 1 to approximately 2 average particle diameters, for example between approximately 60 μm and approximately 120 μm.

According to a preferred aspect of the method, the powder fraction picked up by the deposition unit has a layer thickness perpendicular to the deposition unit that is greater than twice the average particle diameter of the powder particles of the powder fraction. This enables fast and efficient manufacture. The layer thickness is preferably between 2 and 5 average particle diameters. In particular, the powder fraction can be charged triboelectrically. Powders that are triboelectrically chargeable with different polarity are particularly preferably provided in order to be able to deposit and produce component layers with a high layer thickness and different polarity. It is also possible to select different layer thicknesses for different component layers, in particular different powder fractions to be deposited. For example, a lower layer thickness can be selected in regions with fine component structures to be produced than in other regions.

It is another object of the invention to improve an additively manufactured component.

This object is achieved by a component. The component is manufactured using the method described above. The component is characterized in particular by an increased component density and low porosity. The component has improved mechanical properties.

In particular, the component is a multi-material component. The component is characterized in particular by an integral or one-piece combination of different materials. For example, the component can consist of different materials, in particular different polymer materials, in different regions. In particular, different commercially available materials, in particular commercially available polymer materials, can be combined in the component. Particularly preferably, the component comprises a combination of materials with very different properties, in particular with very different mechanical and/or thermal properties, for example with very different melting temperatures. The thermal and/or mechanical properties of the component can be adjusted, in particular locally, in a targeted manner. Joining connections between components made of different materials are not required.

For example, the component can be made integrally from the materials polyamide 12 (PA12) and a urethane-based thermoplastic elastomer (TPE-U). Such a component has the strength and mechanical resilience of PA12 in regions where PA12 has been processed. In regions where TPU has been processed, the component has the properties of TPU that are typical for elastomers. Joining connections between regions made of TPU and PA12 are not required.

It is yet another object of the invention to improve an apparatus for additive manufacturing.

This object is achieved by an apparatus having the features set forth hereinafter. The apparatus has at least one powder reservoir for storing at least one powder, at least one powder charging unit for electrostatically charging powder fractions of the at least one powder and at least one deposition unit, which can be electrostatically charged at least in some regions, for picking up and transferring electrostatically charged powder fractions to a deposition surface. The at least one powder charging unit is designed to electrostatically charge various powder fractions of the at least one powder to produce component layers with different polarity. The apparatus enables an improved additive manufacturing method, in particular with the aid of electrophotographic powder deposition. Disadvantageous charge accumulations in the component to be manufactured are avoided. In particular, the apparatus has the features and advantages described in relation to the manufacturing method.

The operating principle of the at least one powder charging unit is based in particular on the physical effect of gas discharge. The at least one powder charging unit has, for example, a corona wire or a scorotron. The at least one powder charging unit can have a reversible voltage source to generate different polarities.

Alternatively or additionally, the at least one powder charging unit can utilize the triboelectric effect. For example, the at least one powder charging unit can comprise a magnetic brush system.

The apparatus preferably has a control unit which is designed to control the apparatus for carrying out the manufacturing method described above. In particular, the control unit is designed to control the apparatus for additive manufacturing of the component in such a manner that a plurality of component layers of the component to be manufactured are produced, wherein at least one powder fraction of the at least one powder is deposited to produce a component layer, wherein the powder fraction is electrostatically charged by means of the at least one powder charging unit, the at least one deposition unit is electrostatically charged at least in some regions and the electrostatically charged powder fraction is picked up by means of the at least one deposition unit, which is electrostatically charged at least in some regions, and transferred to the deposition surface, wherein various powder fractions with different polarity to be deposited to produce the component layers are electrostatically charged. The control unit allows the manufacturing method to be carried out fully automatically using the apparatus. The control unit can also be designed to carry out the advantageous method steps described above.

According to a preferred aspect of the apparatus, the at least one deposition unit has a temperature control unit for preheating powder fractions at the deposition unit. This reduces, in particular avoids, unfavorable thermal effects, in particular thermal stresses in the components to be produced.

According to a further preferred aspect of the apparatus, the temperature control unit has fluid channels for a heat transfer fluid, which are formed in a base body of the deposition unit. The fluid channels run in particular in a meandering manner in the base body. The fluid channels are particularly preferably arranged in such a manner that uniform preheating of powder fractions over an entire surface of the deposition unit, in particular an entire photoconductive layer of the deposition unit, is ensured.

The temperature control unit preferably has a temperature control device for controlling the temperature of the heat transfer fluid and/or a pump for pumping the heat transfer fluid. The use of fluid channels for a heat transfer fluid has the advantage that the powder can be preheated and, if necessary, the deposition unit can also be cooled to protect it from the temperature prevailing in the installation space. Thermal damage to the deposition unit, in particular its photoconductive layer, is avoided.

Alternatively or additionally, the temperature control unit can also have heating wires and/or one or more Peltier elements.

According to another preferred aspect of the apparatus, the deposition unit has a conductive base body which is connected to a reversible deposition unit voltage source. The conductive base body of the deposition unit can be subjected to a pick-up voltage, holding voltage and/or deposition voltage adapted to the polarity of the electrostatic charge of the powder fraction by means of the reversible deposition unit voltage source. This supports the pick-up and transfer of the powder fraction by means of the deposition unit.

According to a further preferred aspect of the apparatus, the deposition unit has an actuator for generating a mechanical excitation, in particular a vibration excitation, of the deposition unit. The mechanical excitation supports the accurate and precise transfer of the powder fractions to the deposition surface. Undesired adhesion of the powder fractions to the deposition unit is avoided. The actuator is preferably designed as a piezo actuator. A piezo actuator can be used to generate particularly suitable excitation patterns, in particular vibration excitation, in a simple and targeted manner. The mechanical excitation can be flexibly adapted to the powder fraction to be transferred, in particular to the mass of the powder particles and/or their electrostatic charge.

According to another preferred aspect, the apparatus has a transfer structure for generating an electrical transfer field between the deposition unit and the transfer structure. The electrical transfer field supports the transfer, in particular the deposition, of the powder fraction on the deposition surface. This ensures that the powder fraction is deposited in a precise position. The electrical transfer field is formed in particular between a conductive base body of the deposition unit and the transfer structure. For this purpose, the base body of the deposition unit can be subjected to a deposition voltage. The transfer structure is preferably grounded. In particular, the transfer structure has a transfer frame. In particular, the transfer structure has the features and advantages described in relation to the method.

Further advantages and details of the invention are explained in more detail below with reference to the drawings.

DETAILED DESCRIPTION

With reference to FIGS. 1 to 10, a first exemplary embodiment of an apparatus 1 for additive manufacturing of a component and an additive manufacturing method 2 is described below.

Figure 1:
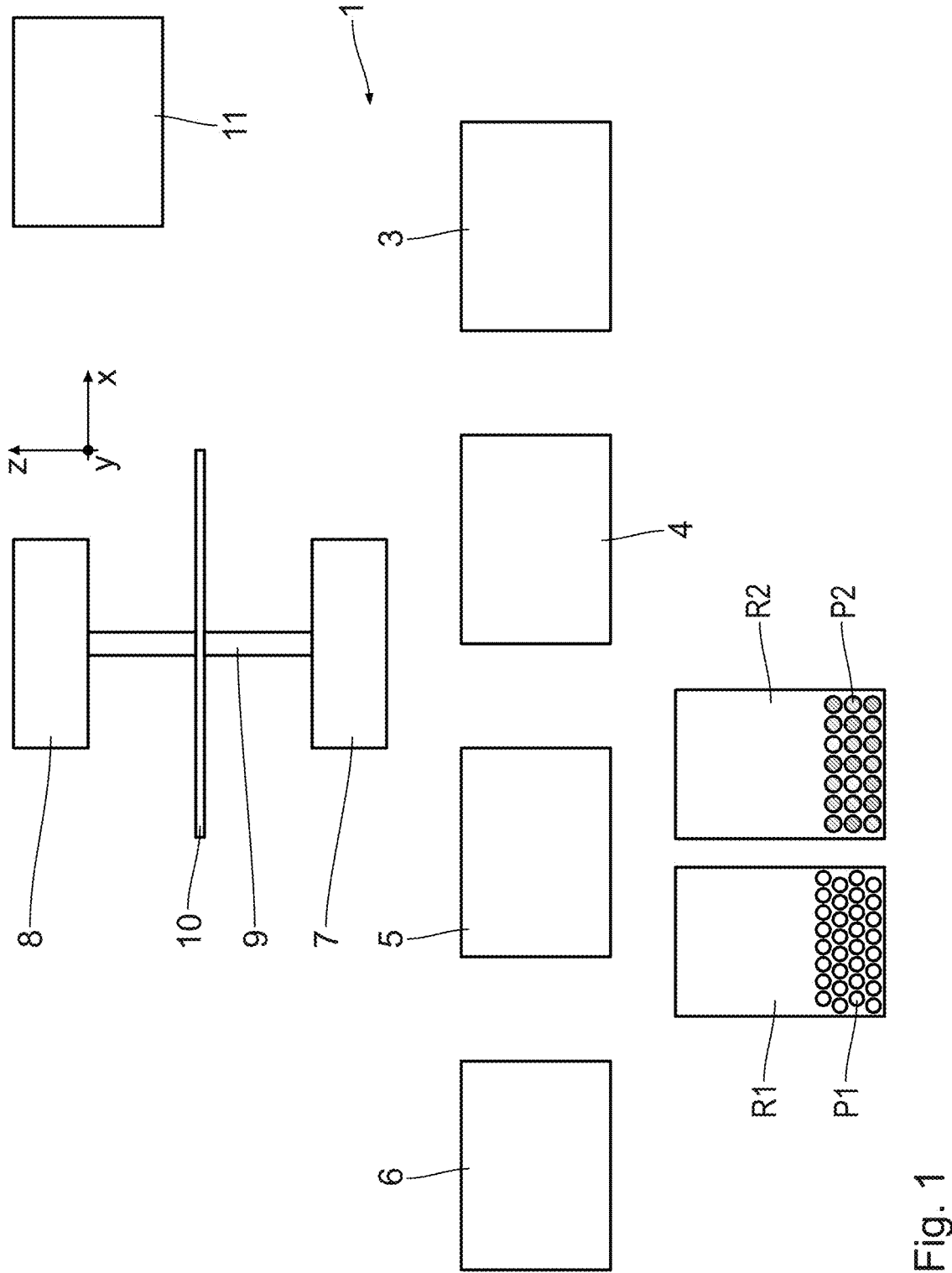
FIG. 1 shows a schematic representation of an apparatus for additive manufacturing of a component.

FIG. 1 shows a schematic representation of the apparatus 1, which is set up for additive manufacturing by means of electrophotographic powder deposition. The apparatus 1 has a charging station 3, an exposure station 4, a developing station 5 and a printing station 6. A deposition unit 7 of the apparatus 1 can be moved between the stations of the apparatus 1. The charging station 3 is used for electrostatically charging the deposition unit 7. At the exposure station 4, the deposition unit 7 is selectively exposed and thus selectively discharged. The exposure station 4 is also used to extinguish any remaining electrostatic charges at the deposition unit 7 after a powder fraction has been transferred into the printing station 6. A powder fraction is electrostatically charged at the developing station 5 and picked up by the deposition unit 7. The picked-up powder fraction is transported to the printing station 6 by the deposition unit 7 and deposited on a deposition surface. The printing station 6 forms an installation space for the component to be manufactured in layers.

The powder fraction is picked up by the deposition unit 7 in the developing station 5 and the powder fraction is deposited in the printing station 6 without contact.

The apparatus 1 is suitable for multi-material processing. The apparatus 1 can be used to combine different materials to form a component. The materials intended for manufacturing the component are provided in the form of powders. For this purpose, the apparatus 1 has various powder reservoirs. The exemplary embodiment shown in FIG. 1 has two powder reservoirs R1, R2 for two different powders P1, P2. In the exemplary embodiment shown, the powders P1, P2 are polymer powders made from different polymer materials. Any polymers can be used for this purpose. Polymers that are typically used in additive manufacturing are particularly suitable, in particular polyamide 12 (PA12), polypropylene (PP), thermoplastic elastomers (TPE), urethane-based thermoplastic elastomers (TPU or TPE-U), high-density polyethylene (PE-HD) and/or polystyrene (PS). In other exemplary embodiments not shown, ceramic and/or metallic powders can also be processed. Polymer and ceramic powders can be directly electrostatically charged for the electrophotographic deposition process. Metal powders are provided with a dielectric coating, for example, in order to be electrostatically chargeable.

The apparatus 1 has a positioning system 8 for moving the deposition unit 7. The positioning system 8 enables the deposition unit 7 to be moved between the stations of the apparatus 1. The displacement takes place translationally in the x-direction. By means of the positioning system 8, the deposition unit 7 can also be positioned in the vertical direction (z-direction). This makes it possible to precisely adjust the distance between the deposition unit 7 and the powder fraction to be picked up at the developing station 5 and a deposition surface at the printing station 6. The travelling speed in the x-direction can be between 0.2 m/s and 1.0 m/s, for example. The travelling speed in the z-direction is, for example, between approximately 10 mm/s and approximately 20 mm/s.

The transferred powder particles are solidified at the printing station 6. With polymer powders in particular, this can be done by melting the powder particles. Therefore, usually, high temperatures prevail at the printing station 6. The deposition unit 7 is connected to the positioning system 8 via a supporting arm 9. The supporting arm 9 ensures that the positioning system 8 is sufficiently distanced from the installation space and the temperatures prevailing therein. The supporting arm 9 can have a length of approximately 50 cm, for example. For further thermal shielding of the positioning system 8, a thermal separator 10 is also arranged between the deposition unit 7 and the positioning system 8. The thermal separator 10 is, for example, a roller cover made of aluminized Kevlar. The thermal separator 10 has a thickness of 0.8 mm and a width of 90 mm, for example.

The positioning system 8 has a linear axis for the displacement in the x-direction and a precision lifting table for the displacement in the z-direction. Alternatively, other positioning systems are also possible, for example spindle-, belt- and/or chain-driven positioning systems.

The apparatus 1 has a control unit 11. The control unit 11 controls the apparatus 1 to carry out additive manufacturing. For example, design data, in particular CAD data, for the component to be manufactured is stored on the control unit 11. The control unit 11 controls the apparatus 1 in order to carry out layer-by-layer manufacturing of the component in accordance with the design data.

Figure 2:
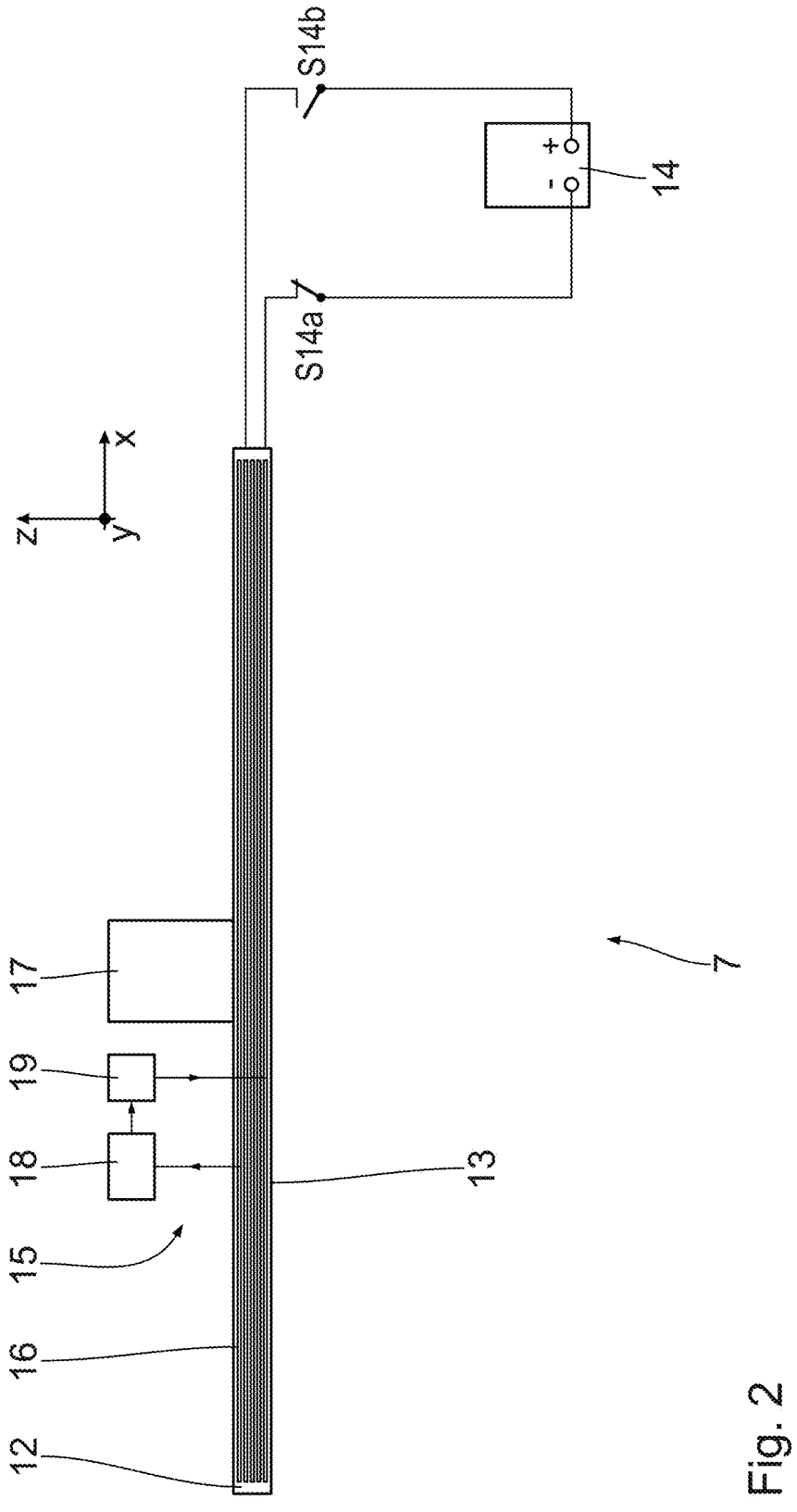
FIG. 2 shows a schematic representation of a deposition unit of the apparatus according to FIG. 1.

FIG. 2 shows the deposition unit 7 schematically. The deposition unit 7 has a base body 12. The base body 12 is designed as an aluminum plate. The base body 12 is square in the plane formed by the x-direction and the y-direction. It has an exemplary side length of 100 mm. In the z-direction, the base body 12 has a height of 5 mm, for example.

A photoconductor layer 13 is provided on the surface of the base body 12, which is used to pick up the powder fraction. The photoconductor layer 13 is made of arsenic (III) selenide ($As_2Se_3$). It has an exemplary layer thickness of between 80 μm and 120 μm. The photoconductor layer 13 is dielectric, but becomes locally conductive in the exposed region when excited with light due to the photoelectric effect.

The base body 12 is connected to a deposition unit voltage source 14. A high voltage can be applied to the base body 12 of the deposition unit 7 with the aid of the deposition unit voltage source 14. The voltage is applied in the form of a pick-up, holding and/or deposition voltage, as will be described below. The polarity of the voltage supply can be reversed using the switches S14*a* and S14*b*. The switches S14*a*, S14*b* can be controlled by the control unit 11.

The deposition unit 7 has a temperature control unit 15. The temperature control unit 15 is used to preheat the powder fraction adhering to the deposition unit 7 before it is deposited in the printing station 6. Preheating the powder fraction causes the temperature of the powder to be adjusted to the temperatures prevailing in the installation space of the printing station 6. This reduces thermal stresses in the component to be produced. The disadvantageous effect of curling is avoided, particularly when processing polymer powders. The temperature control unit 15 heats the powder fraction to a temperature just below its melting temperature. This prevents components of the powder fraction from melting on the deposition unit 7 and sticking thereto. Contamination and damage to the deposition unit by melted powder components is avoided.

The temperature control unit 15 has fluid channels 16 through which a heat transfer fluid in the form of a heat transfer oil is pumped. The fluid channels 16 run in a meandering manner in the base body 12 and evenly cover the entire surface of the base body 12 in the x-y plane. The fluid channels 16 can have a diameter of 4.2 mm, for example. The heat transfer oil is brought to the desired temperature using a temperature control device 18 and pumped in the fluid channels 16 using a pump 19. In FIG. 2, a fluid circuit of the heat transfer oil with the fluid channel 16, the temperature control device 18 and the pump 19 is indicated by arrows.

The heat transfer fluid pumped in the fluid channels 16 brings the deposition unit 7 to a desired temperature. This preheats the powder fraction to be transferred by the deposition unit 7. In addition, the temperature control unit prevents the deposition unit 7 from heating up too much in the installation space. Damage to the photoconductor layer 13 due to the temperatures prevailing in the installation space is avoided.

In other embodiments not shown, the temperature control unit has at least one Peltier element and/or heating wires.

The deposition unit 7 has an actuator 17 in the form of a piezo actuator. The actuator 17 serves for mechanical excitation of the deposition unit 7. The mechanical excitation simplifies the deposition of the powder fraction in the printing station 6. The mechanical excitation increases the distances between individual powder particles, which reduces both the interparticle forces of attraction as a result of the van der Waals interaction and the electrostatic forces of attraction. The mechanical excitation can be achieved in particular by applying a sine, square and/or triangular voltage or combinations thereof to the piezo actuator 17. The peak-to-peak voltage is between 300 volts and 500 volts, for example. The excitation frequency is, for example, in the frequency ranges 100 Hz to 500 Hz, 1 kHz to 2 kHz and/or 10 kHz to 18 kHz. Excitation with pulse sequences consisting of a strong pre-pulse and several irregular subsequent pulses of smaller amplitude has proven to be particularly suitable. The peak-to-peak voltage of the pre-pulse can be approximately 1,000 volts, for example.

In other exemplary embodiments not shown, the actuator 17 is not arranged directly on the deposition unit 7, but in the region of the supporting arm 9. In yet other exemplary embodiments, mechanical excitation can also be achieved by strong acceleration by means of the positioning system 8.

Figure 3:
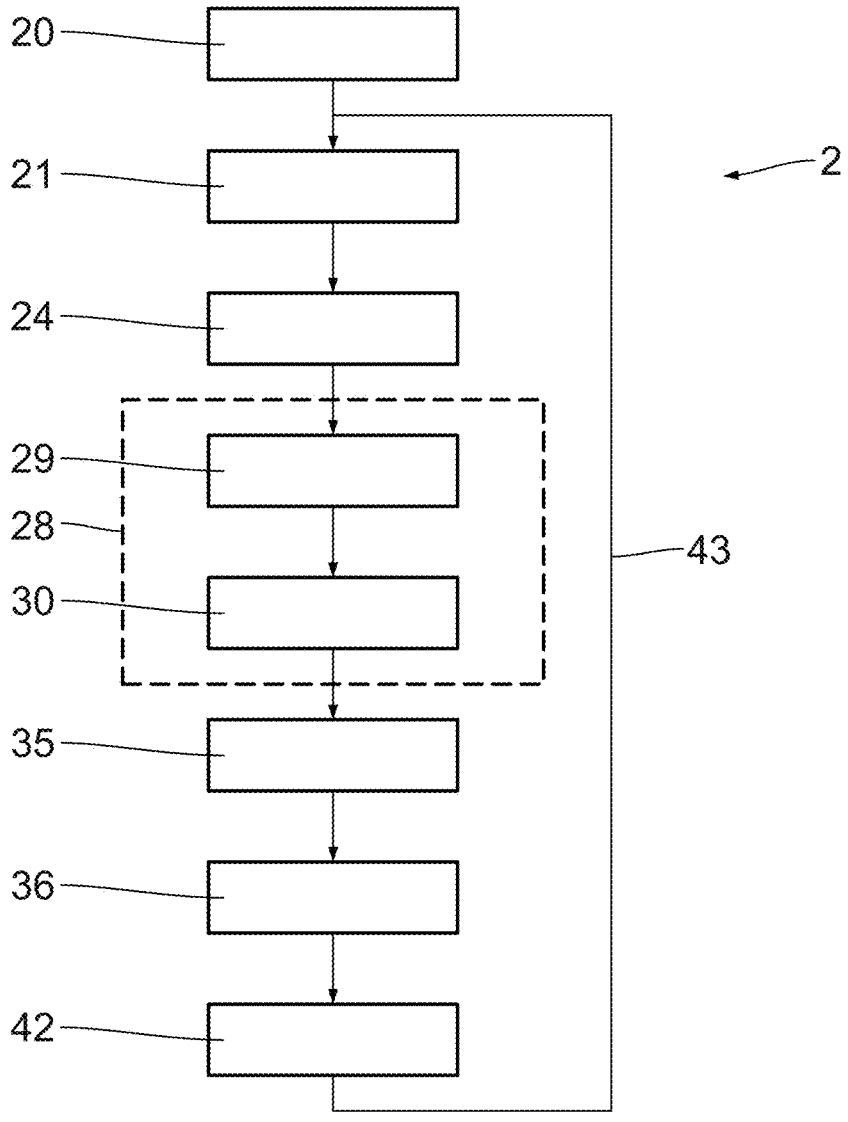
FIG. 3 shows a schematic method sequence for additive manufacturing of a component, in particular using the apparatus shown in FIG. 1.
Figure 5:
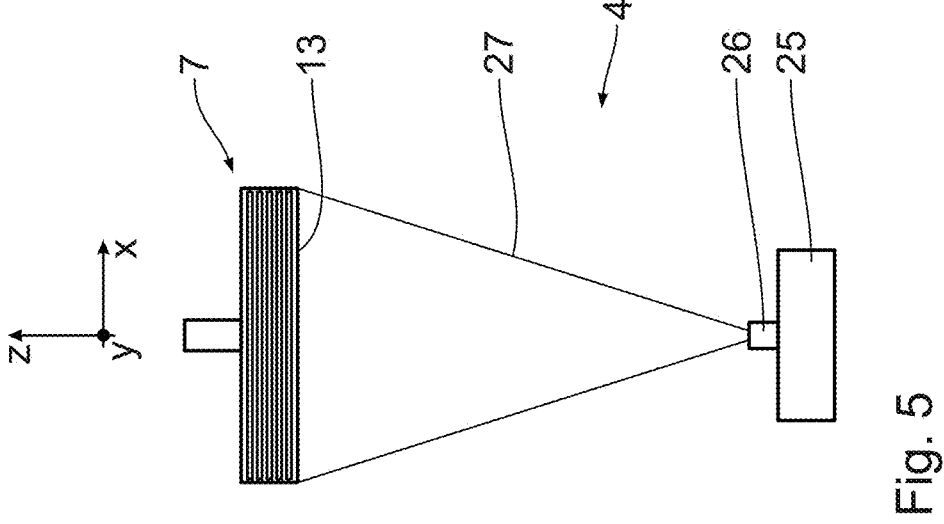
FIG. 5 shows a schematic representation of an exposure station of the apparatus according to FIG. 1 during selective exposure of the deposition unit.
Figure 4:
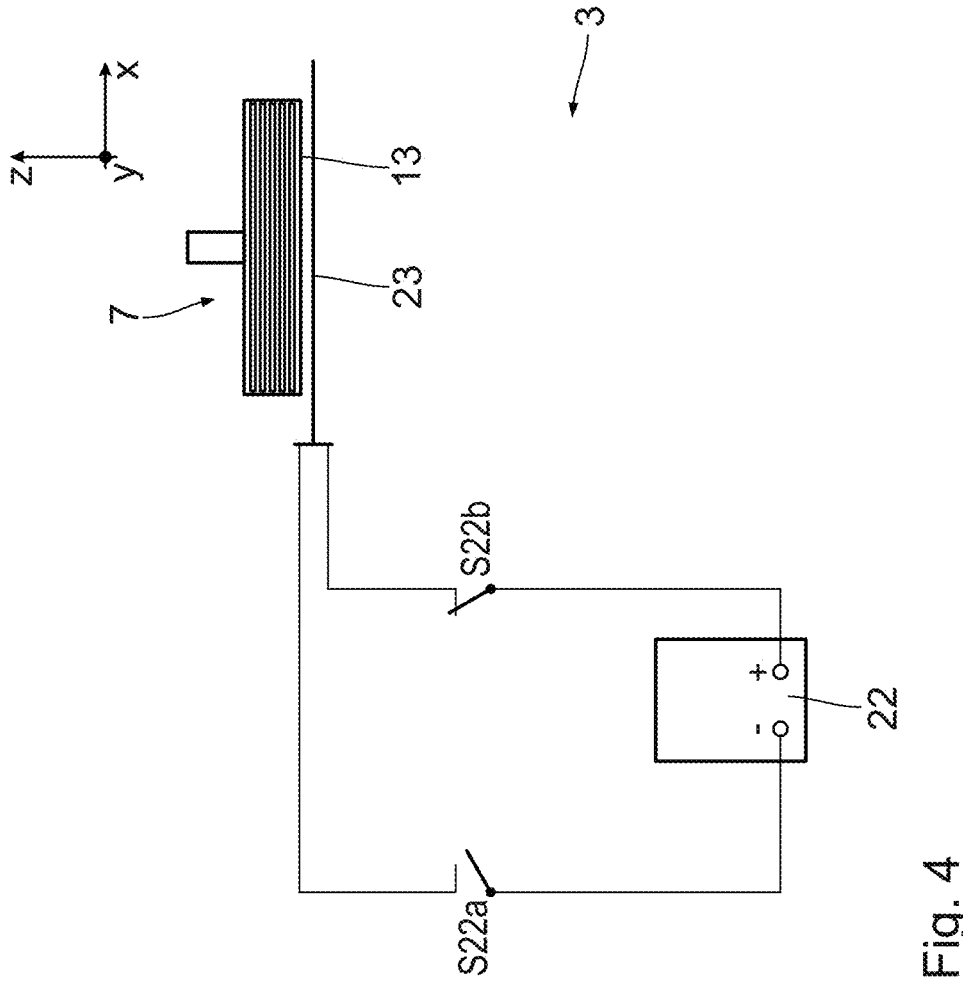
FIG. 4 shows a schematic representation of a charging station of the apparatus according to FIG. 1 during the electrostatic charging of the deposition unit.
Figure 6:
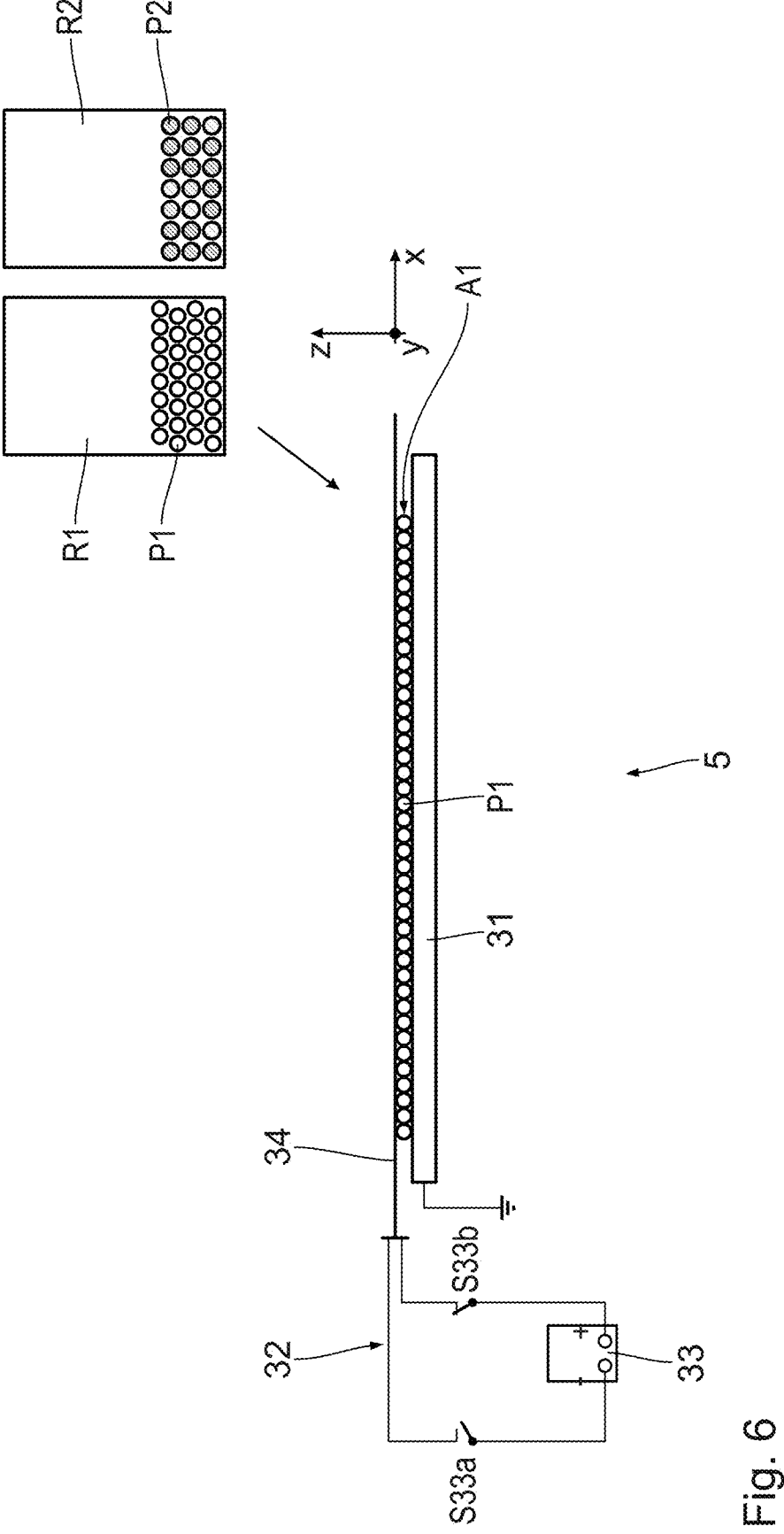
FIG. 6 shows a schematic representation of a developing station of the apparatus according to FIG. 1 during the charging of a powder fraction of a powder for the electrophotographic deposition process.
Figure 7:
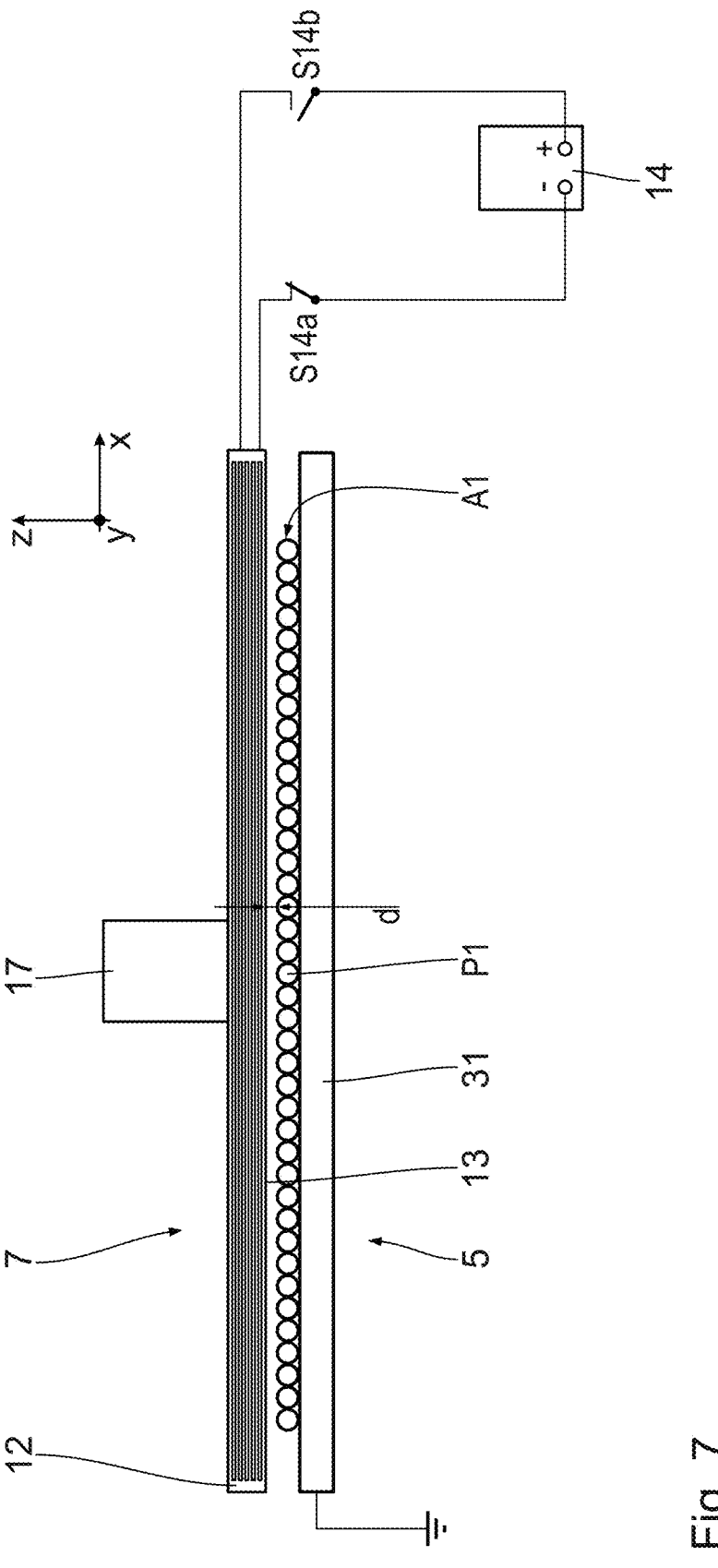
FIG. 7 shows the developing station according to FIG. 6 when the electrostatically charged powder fraction is picked up by the deposition unit.
Figure 8:
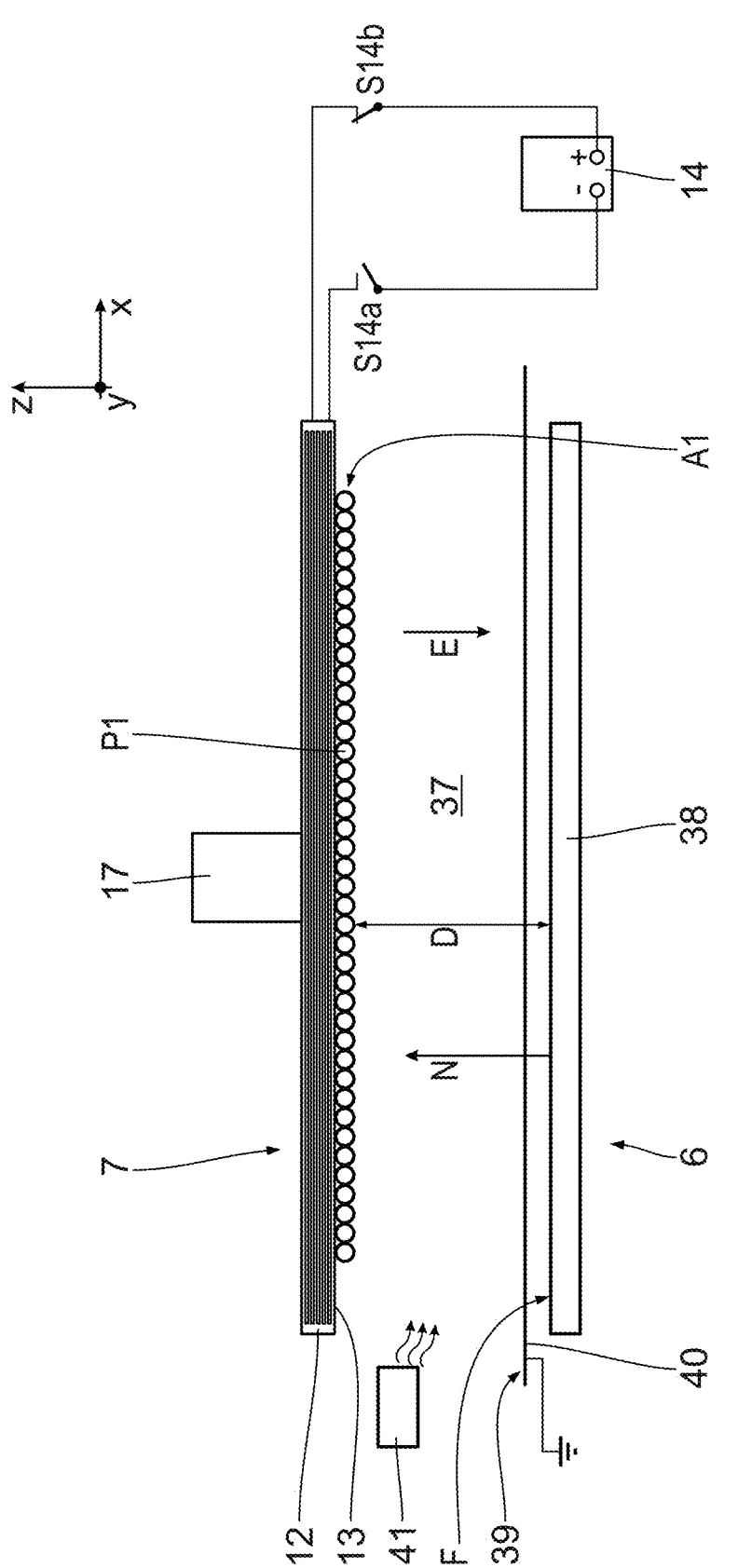
FIG. 8 shows a schematic representation of a printing station of the apparatus according to FIG. 1 during the transfer of a powder fraction to produce a first component layer of the component to be manufactured.

The further design of the apparatus 1 and its stations 3 to 6 are explained in more detail below as part of the description of the manufacturing method 2. FIG. 3 shows a schematic method sequence of the manufacturing method 2. In particular, the manufacturing method 2 is carried out using the apparatus 1.

In a providing step 20, the powders required to manufacture the component, in this case the powders P1, P2, are provided. Design data for the component to be manufactured can also be provided in the providing step 20, for example by transmitting the data to the control unit 11.

The providing step 20 is followed by the layer-by-layer manufacturing of the component by producing multiple component layers. To produce a component layer, at least one powder fraction of the powders P1, P2 is deposited and solidified. The production of the component layers is controlled by the control unit 11 and comprises the steps described below.

In a deposition unit charging step 21, the photoconductor layer 13 of the deposition unit 7 is electrostatically charged. The photoconductor layer 13 of the deposition unit 7 is charged in the charging station 3, as shown as an example in FIG. 4. The charging station 3 comprises a charging voltage source 22, via which a corona wire 23 can be supplied with high voltage. The polarity of the voltage applied to the corona wire 23 can be set via the switches S22a, S22b, which can be controlled via the control unit 11. To charge the entire photoconductor layer 13, the corona wire 23 can be adjusted along the y-direction. To manufacture the first component layer, the corona wire 23 is connected to the positive pole of the charging voltage source 22. This charges the photoconductor layer 13 positively, for example to a potential of 600 volts.

In other exemplary embodiments not shown, charging units that work differently, in particular charging units based on the principle of gas discharge, can also be used instead of the corona wire 23. In an advantageous exemplary embodiment, a scorotron is used to charge the photoconductor layer 13.

The deposition unit charging step 21 is followed by an exposure step 24. Exposure step 24 is carried out with the aid of exposure station 4, as shown schematically in FIG. 5. The exposure station 4 has an exposure apparatus 25 for selective exposure of the photoconductor layer 13. To generate the radiation 27 required for this, the exposure apparatus 25 has a light-emitting diode 26. With the aid of the exposure apparatus 25, the radiation 27 is selectively irradiated onto regions of the photoconductor layer 13 to be exposed. The regions of the photoconductor layer 13 irradiated with the radiation 27 become temporarily conductive, so that the electrostatic charge generated in the deposition unit charging step 21 is discharged locally. The selective irradiation selectively discharges the photoconductor layer 13 of the deposition unit 7. When using a photoconductor layer 13 made of arsenic (III) selenide, the use of radiation 27 with a wavelength of 613 nm has proven to be particularly suitable. The exposure time is preferably adapted to the level of the powder charge. Exemplary exposure times are between 10 ms and 300 ms. The selective irradiation and discharge of the photoconductor layer 13 defines those regions to which powder fractions adhere in a later developing step and are transferred to the installation space of the printing station 6. The selective exposure thus defines a contour of the component in the component layer to be produced.

A developing step 28 is carried out at the developing station 5. The developing step 28 is divided into a powder charging step 29 and a powder pick-up step 30, which are explained in more detail below with reference to FIGS. 6 and 7.

The developing station 5 has a grounded base surface 31. A powder fraction A1 of the powder P1 is deposited on the base surface 31 from the powder reservoir R1 in the form of a layer of powder particles. A powder fraction A1 is electrostatically charged with the aid of a powder charging device 32. The powder charging device 32 has a voltage source 33, which is connected to a corona wire 34. A high voltage can be applied to the corona wire 34 using the voltage source 33. The polarity of the voltage applied to the corona wire 34 can be changed using the switches S33a, S33b. To electrostatically charge the powder fraction A1, the corona wire 34 is guided in the y-direction over the powder layer deposited on the base layer 31. The corona wire 34 can also be positioned in the z-direction in order to ensure optimum adaptation to the powder P1 used, in particular the size of the powder particles. Depending on the switch position of the switches S33a, S33b, the corona wire 34 and thus the powder fraction A1 is charged with different polarity. In the powder charging step 29 shown in FIG. 6 for manufacturing the first component layer, for example, the powder is charged with a positive voltage. For example, the powder is charged to a potential of between 400 volts and 1,000 volts.

The powder charging step 29 can take place at the same time as the deposition unit charging step 21 and/or the exposure step 24.

Instead of the corona wire 34, other charging units, in particular charging units based on gas discharge, can also be used in other exemplary embodiments. In particular, a scorotron can be used instead of the corona wire 34, which enables more precise adjustment of the desired surface potential.

In powder pick-up step 30, the powder fraction A1 is picked up by the deposition unit 7. For this purpose, the deposition unit 7 is moved to the developing station 5. For the sake of clarity, the powder charging device 32 of the developing station 5 is not shown in FIG. 7. The deposition unit 7 is also positioned in the z-direction to pick up the powder fraction A1. The positioning is carried out in such a manner that a distance d remains between the photoconductor layer 13 of the deposition unit 7 and the surface of the charged powder fraction A1. The powder fraction A1 is picked up without contact. The distance d is selected depending on the mass of the powder particles and their electrostatic charge. The distance d can be between 1 mm and 8 mm, for example.

To pick up the powder fraction A1, a pick-up voltage is applied to the base body 12 of the deposition unit 7 by means of the deposition unit voltage source 14. The pick-up voltage has a polarity opposite to the charge of the powder fraction A1 and thus supports the electrostatic attraction of the powder particles. In the present case, the photoconductor layer 13 is positively charged in the unexposed regions. The powder fraction A1 is also positively charged. The non-exposed regions of the photoconductor layer 13 locally reduce the force of attraction on the powder particles generated by the pick-up voltage. The pick-up voltage, electrostatic charge of the photoconductor layer 13 and electrostatic charge of the powder fraction A1 are coordinated with respect to one another in such a manner that only powder particles of the powder fraction A1 in previously exposed and thus discharged regions of the photoconductor layer 13 are attracted and adhere there. Depending on the polarity, a suitable pick-up voltage can be between −100 V and −300 V or between 100 V and 300 V, for example.

Picking up the powder fraction in which powder particles adhere to previously exposed and discharged regions of the photoconductor layer 13 is referred to as white writing or "discharged area development". Alternatively, it is also possible to charge the photoconductor layer 13 and the powder fraction A1 with opposite polarity. The charged regions of the photoconductor layer 13 that are not discharged by the exposure then attract the powder particles charged with the opposite polarity. If applicable, the powder particles only adhere to the unexposed regions. This type of process is known as black writing or "charged area development".

After picking up the powder fraction A1 in the previously exposed regions of the photoconductor layer 13, a transfer step 35 takes place to transfer the powder from the developing station 5 to the printing station 6.

In the transfer step 35, the powder fraction A1 is transported to the printing station 6 with the aid of the deposition unit 7 by moving the deposition unit 7 into the printing station 6. During the transfer from the developing station 5 to the printing station 6, the base body 12 of the deposition unit 7 is subjected to a holding voltage corresponding to the pick-up voltage. The powder fraction A1 adhering to the deposition unit 7 is preheated with the aid of the temperature control unit 15. Preheating is carried out to a temperature T that is just below the melting temperature TS of the powder fraction A1, preferably to a temperature within the quasi-isothermal process window. In this manner, the temperature of the powder fraction A1 to be transferred is adapted to the temperature prevailing at the printing station 6.

A printing step 36 takes place at the printing station 6. In the printing step 36, the powder fraction A1 is transferred to a deposition surface F by means of the deposition unit 7. For this purpose, the powder fraction A1 is deposited on the deposition surface F. The printing station 6 and the printing step 36 are explained in more detail below with reference to FIG. 8.

The printing station 6 forms an installation space 37 with an installation platform 38. During the manufacture of the first component layer, the surface of the installation platform 38 facing the deposition unit 7 forms the deposition surface F. A surface normal N of the deposition surface F is orientated parallel to the z-direction.

The installation space 37 can be filled with air or contain a protective gas. Suitable protective gases are, for example, nitrogen and/or a noble gas, in particular argon.

The printing station 6 has a transfer structure 39. The transfer structure 39 has a transfer frame consisting of four copper rods 40 arranged in the shape of a frame. The copper rods 40 are cylindrical and each have a diameter of 0.8 mm, for example. The copper rods 40 are welded together at their ends and thus form a square transfer frame. The transfer frame has a side length that exceeds the side length of the deposition unit 7, in particular its base body 12. In the x-y plane, the transfer structure 39 is therefore arranged around the circumference of the deposition unit 7. The copper rods 40 and thus the transfer structure 39 are grounded.

The transfer structure 39 can be moved in the direction of the surface normal N of the deposition surface F. The transfer structure 39 can therefore be moved in the z-direction.

The deposition unit 7 is positioned above the deposition surface F and adjusted in the z-direction. This sets a distance D between the powder particles adhering to the photoconductor layer 13 and the deposition surface F. The distance D can be suitably selected for the contactless deposition of the powder particles of the powder fraction A1, in particular considering the charge of the powder particles and their mass. An exemplary distance D is between 1 mm and 8 mm.

The transfer structure 39 is arranged with the copper rods 40 in the direction of the surface normal N, i.e. in the z-direction, between the deposition surface F and the deposition unit 7. The transfer structure 39 is positioned in the z-direction in such a manner that a distance between the copper rods 40 and the deposition surface F essentially corresponds to the particle diameter of the powder particles of the powder fraction A1.

To deposit the powder fraction A1, the polarity of the voltage applied to the base body 12 of the deposition unit 7 is reversed. The base body 12 is therefore subjected to a deposition voltage corresponding to the polarity of the charge of the powder fraction A1. An electric field E, also known as a transfer field, is formed between the energized base body 12 and the grounded transfer structure 39. The actuator 17 is used to mechanically excite the deposition unit 7 in order to overcome interparticle forces of attraction between the powder particles and the photoconductor layer 13. The powder particles of the powder fraction A1 detach from the photoconductor layer 13 and are deposited along the transfer field E on the deposition surface F.

The powder fraction A1 deposited on the deposition surface F in this manner is solidified. The polymer powders used in the exemplary embodiment shown are melted for this purpose by heating the installation space 37 to a temperature above the melting temperature TS of the powder P1. The printing station 6 has a heating device 41 for heating the installation space 37. The heating device 41 has, for example, radiant heaters and/or lasers, in particular $CO_2$ lasers and/or thulium lasers.

In further exemplary embodiments, the printing station has lasers for selectively melting the deposited powder fractions. The lasers can be part of the heating device. In particular, the heating device has radiant heaters for preheating the powder and lasers for selectively melting the powder. This is particularly advantageous for processing different powders with very different melting temperatures. In the case of high-melting powders, lasers can also be provided in each case for preheating and melting the powder. When processing a low-melting powder and a high-melting powder, the radiant heater can be used to preheat the low-melting powder, a first laser can be used to preheat the high-melting powder and a second laser can be used to homogeneously melt the respective powders.

Ceramic and/or metallic powders have significantly higher melting temperatures than polymer powders. Correspondingly higher temperatures are required for thermal solidification. Metallic and/or ceramic powders are therefore usually solidified by selective energy input, for example by selective laser sintering and/or electron beam melting. This can involve preheating the metallic and/or ceramic powders. As this usually requires high temperatures, for example up to 600° C., there is a risk of damage to the photoconductor layer. Metallic and/or ceramic powders are therefore often deposited at room temperature. Solidification then takes place, for example, by irradiating a correspondingly higher energy input for selective melting. Higher laser intensities and/or other wavelengths can be advantageous for this.

The deposited powder fractions can be solidified alternatively or additionally by non-thermal methods, for example by binder jetting. In particular, when solidifying by binder jetting, a green part of the component to be manufactured is additively manufactured, which is debinded in a subsequent step and sintered to form the finished component.

After deposition of the powder fraction A1, a cancellation step 42 takes place. In the cancellation step 42, remaining charges of the photoconductor layer 13 of the deposition unit 7 are cancelled by exposing the entire surface of the photoconductor layer 13 to the radiation 27. The cancellation step 42 is carried out using the exposure station 3. Exposure times of approximately 100 ms can be used to cancel the charges, for example.

The deposited powder fraction A1 forms a first component layer B1. To deposit further component layers, the aforementioned steps are repeated, as indicated in FIG. 3 by the repetition loop 43. In the manufacturing method 2, the powder fractions used to produce successive component layers are electrostatically charged with different polarities. For this purpose, the polarity of the voltage source 33 of the powder charging unit 32 is reversed for charging the powder fractions for different component layers using the switches S33$a$, S33$b$. Accordingly, the pick-up voltage, holding voltage and deposition voltage are applied to the base body 12 of the deposition unit 7 with the polarity adjusted accordingly. For this purpose, the application of voltage to the base body 12 is controlled accordingly by means of the switches S14$a$, S14$b$ of the deposition unit voltage source 14 during the manufacture of successive component layers. During the deposition of the powder fractions, the photoconductor layer 13 of the deposition unit 7 is charged with the same polarity in each case. The alternately charged powder fractions are then picked up and held alternately in the charged and discharged regions of the photoconductor layer 13 by means of black and white writing. This procedure has the advantage that conventional photoconductor layers, which can only be charged with one polarity, can be used to apply powder fractions with different polarities.

The alternating charging of the powder fractions to produce successive component layers prevents a detrimental accumulation of charge in the component to be manufactured. Electrostatic repulsion of the powder particles is reduced. In fact, the charging of the powder fractions with alternating polarity causes the powder fractions of successive component layers to attract each other electrostatically. This increases the stability of the component layers during manufacture. In addition, the packing density of the powder particles is increased during manufacture. The manufactured component has an increased density and improved mechanical properties.

Figure 9:
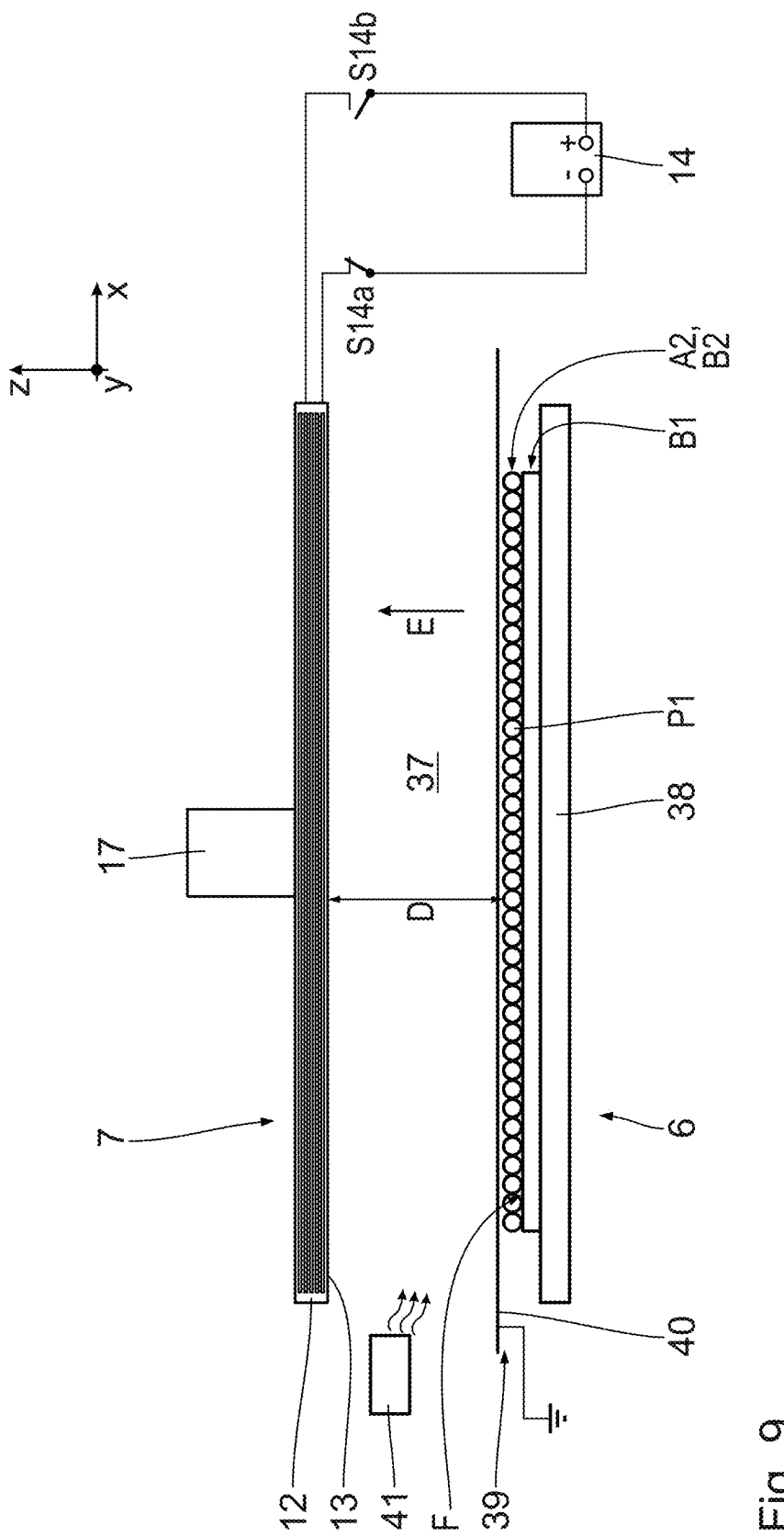
FIG. 9 shows the printing station according to FIG. 8 after the deposition of a further powder fraction to produce a further component layer of the component to be manufactured.

FIG. 9 shows an example of the production of a further component layer B2 by depositing a powder fraction A2. FIG. 9 relates to the printing step in the printing station 6. The previously deposited and solidified component layer B1 forms the deposition surface F for the powder fraction A2. The powder fraction A2 is already deposited on the deposition surface F in FIG. 9. The powder fraction A2 is charged with a polarity opposite to that of the powder fraction A1. Accordingly, the polarity of the deposition unit voltage source 14 for generating the deposition voltage is reversed compared to the previous printing step. To generate the deposition voltage, a voltage of negative polarity is applied to the base body 12 of the deposition unit 7. Accordingly, the electrical transfer field E has an opposite direction.

As the deposition unit 7 can be moved in the z-direction, a desired distance D between the powder fractions adhering to the deposition unit 7 and the deposition surface F can be maintained regardless of the height of the component layers already produced. The movability of the transfer structure 39 in the z-direction also enables the position of the transfer device 39 to be adapted to the height of component layers that have already been produced. Due to the suitable positioning of the transfer structure 39 relative to the deposition unit 7, the strength of the transfer field E can be adjusted independently of the component height already produced.

Figure 10:
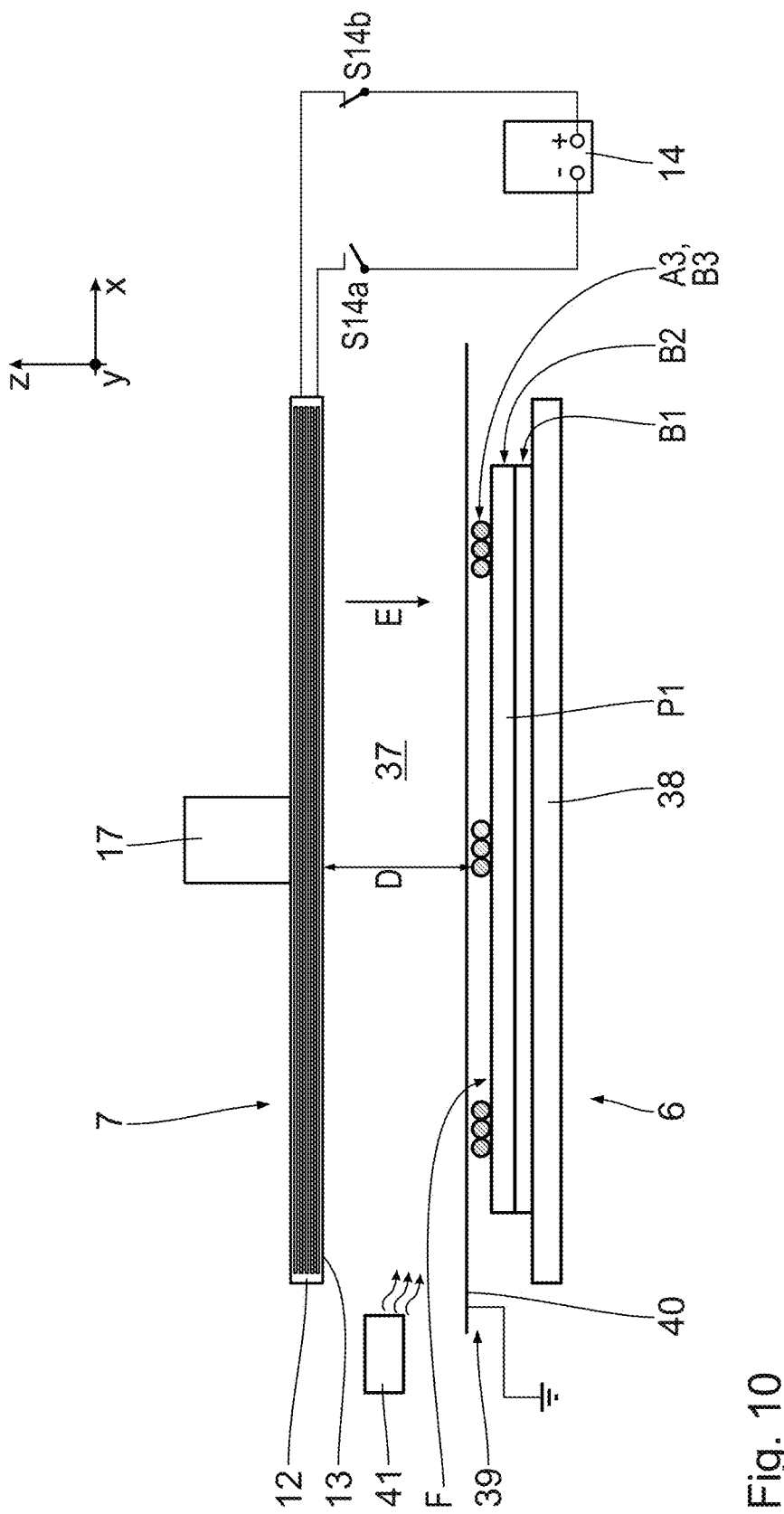
FIG. 10 shows the printing station according to FIG. 8 after the deposition of another powder fraction of a different powder for the production of another component layer of the component to be manufactured.

FIG. 10 shows an example of the production of a further component layer B3. FIG. 10 shows the printing station 6 after a powder fraction A3 has been deposited on the component layers B1 and B2 that have already been produced. The surface of the last component layer B2 produced forms the deposition surface F for the deposition of the powder fraction A3. The powder fraction A3 consists of the powder P2. Component layer B3 is therefore made from a different material than the component layers B1 and B2 that have already been produced. While the corresponding powder fractions A1 and A2 were deposited over the entire surface to produce the component layers B1 and B2, the powder fraction A3 is deposited selectively.

In further method steps, a further powder fraction can be deposited in layer regions of the component layer B3 in which the powder fraction A3 is not deposited. In this way, different powder fractions and therefore different materials can be combined within one component layer. Different powder fractions that are used to manufacture the same component layer are charged with the same polarity.

In the exemplary embodiment shown, all powder fractions of a component layer are charged with the same polarity. The powder fractions of different component layers are charged with alternating polarity. A powder fraction of a further component layer to be deposited is charged with a polarity that is opposite to the polarity of the respective deposition surface, i.e. the polarity of the previously deposited component layer. This results in a particularly favorable electrostatic attraction between successive component layers. In addition, charge accumulation in the component to be produced is reliably avoided.

Figure 11:
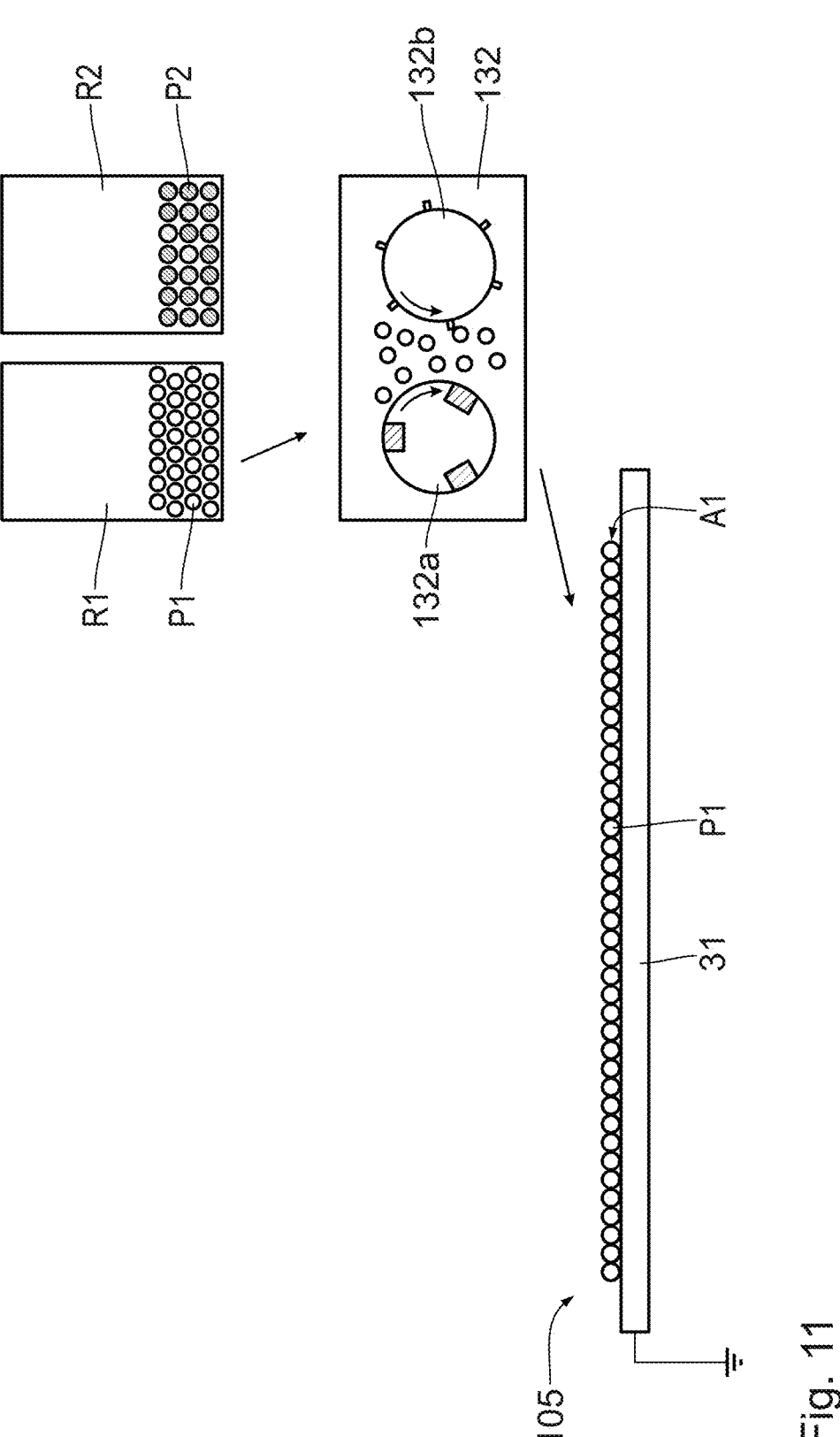
FIG. 11 shows a schematic representation of a further exemplary embodiment of a developing station for an apparatus for additive manufacturing of a component.

FIG. 11 shows another exemplary embodiment of a developing station 105, an apparatus for additive manufacturing. Components that have already been described in relation to the exemplary embodiment shown in FIGS. 1 to 10 bear the same reference signs and are not explained again in detail.

The developing station 105 has a powder charging unit 132 for triboelectrically charging the powder fractions. The powder charging unit 132 is designed as a magnetic brush system. The powder fraction to be electrostatically charged is guided between the rollers 132$a$, 132$b$ of the powder charging unit 132 and is triboelectrically charged in the process. The charged powder is deposited to the grounded base plate 31 in the form of a powder layer. The two different powders P1, P2 are used to charge different powder fractions with different polarity, which are each charged with different polarity during triboelectric charging. To produce successive component layers, the powders P1 and P2 are therefore used alternately so that the respective powder fractions are charged with different polarity. By triboelectrically charging the powders P1, P2, powder fractions with a layer thickness of more than twice the average particle diameter of the respective powders P1, P2 can be applied. For example, layer thicknesses of between approximately 1 and approximately 5 average particle diameters can be deposited.

The powders P1, P2 are, for example, powder formulations of polymer particles that are coated with suitable charge control agents, in particular with functionalized silica particles. The powders P1, P2 have, for example, a base powder in the form of a commercially available polymer powder. For triboelectric charging with different polarities, the base powders are each coated with other charge control agents, in particular other functionalized silica particles. For triboelectric charging with negative polarity, for example, the base powder is coated with a mixture of hexamethyldisilazane (HMDS) and polydimethylsiloxane (PDMS). For triboelectric charging with positive polarity, the base powder is coated with a mixture of polydimethylsiloxane (PDMS) and nitrogen compounds —$NR_2$ and —$NR_3$, for example. The proportion of functionalized silica particles is between 0.05% and 1% by weight relative to the mass of the polymer.

The invention claimed is:

1. A method for additive manufacturing of a component, comprising the steps of
   providing at least one powder, and
   producing a plurality of component layers of the component to be manufactured, wherein at least one powder fraction of the at least one powder is deposited to produce each component layer,
   wherein each powder fraction is electrostatically charged in a developing station,
   wherein a deposition unit is electrostatically charged at least in some regions,
   wherein each electrostatically charged powder fraction is picked up by the deposition unit from the developing station and transferred to a deposition surface in a printing station by transferring the deposition unit with the powder fraction adhered thereto from the developing station to the printing station and depositing the powder fraction from the deposition unit onto the deposition surface,
   wherein different powder fractions to be deposited to produce the component layers are electrostatically charged with different polarities, and
   wherein the deposition unit is mechanically excited by an actuator of the deposition unit to deposit the powder fraction from the deposition unit onto the deposition surface.

2. The method according to claim 1, wherein the powder fractions to be deposited to produce successive component layers are electrostatically charged with alternating polarity.

3. The method according to claim 1, wherein a surface potential of the deposition surface is measured in order to determine the polarity of the powder fraction to be deposited next.

4. The method according to claim 1, wherein the pick-up and/or transfer of the electrostatically charged powder fraction by means of the deposition unit is contactless.

5. The method according to claim 1, wherein the powder fraction is preheated at the deposition unit.

6. The method according to claim 5, wherein the powder fraction is preheated at the deposition unit to a temperature T for which the following applies: $TS–\Delta T \leq T < TS$, wherein TS is a melting temperature of the powder fraction and $\Delta T$ is 30° C.

7. The method according to claim 5, wherein the powder fraction is preheated at the deposition unit to a temperature T for which the following applies: $TR–\delta T < T$, wherein TR is a recrystallization temperature of the powder fraction and $\delta T$ is 20° C.

8. The method according to claim 1, wherein the deposition surface is preheated to a temperature T2, for which the following applies: $TR < T2 < TS$, wherein TR is a recrystallization temperature and wherein TS is a melting temperature of the powder fractions to be deposited.

9. The method according to claim 1, wherein the deposition unit is vibrated at an excitation frequency of between 100 Hz and 20 KHz in order to transfer the powder fraction to the deposition surface.

10. The method according to claim 9, wherein the excitation frequency is in the range of one of the natural frequencies of the deposition unit.

11. The method according to claim 1, wherein the mechanical excitation takes place by a pulse sequence consisting of a strong pre-pulse and irregular subsequent pulses with a smaller amplitude.

12. The method according to claim 1, wherein the mechanical excitation takes place by a piezo actuator of the deposition unit.

13. The method according to claim 1, wherein an electric transfer field is generated between the deposition unit and a transfer structure for transferring the powder fraction to the deposition surface.

14. The method according to claim 13, wherein the deposition unit is mechanically excited by an actuator of the deposition unit in order to transfer the powder fraction to the deposition surface, after the electrical transfer field has been established completely.

15. The method according to claim 1, wherein at least two different powders are provided, wherein the at least two different powders are triboelectrically chargeable with different polarities.

16. The method according to claim 1, wherein the powder fraction picked up with the deposition unit has a layer thickness perpendicular to the deposition unit which is greater than twice the average particle diameter of the powder particles of the powder fraction.

17. A component manufactured using a method according to claim 1.

18. An apparatus for additive manufacturing of a component, comprising:
   at least one powder reservoir for storing at least one powder,
   at least one powder charging unit for electrostatically charging powder fractions in a developing station, and
   at least one deposition unit configured to be electrostatically charged, at least in some regions, for pick up and transfer of electrostatically charged powder fractions to a deposition surface in a printing station by transferring the deposition unit with the powder fraction adhered thereto from the developing station to the printing station and depositing the powder fraction from the deposition unit onto the deposition surface,
   wherein the at least one powder charging unit is designed to electrostatically charge different powder fractions of the at least one powder to produce component layers with different polarity, and
   wherein the deposition unit has an actuator for generating a mechanical excitation of the deposition unit for depositing the powder fraction from the deposition unit onto the deposition surface.

19. The apparatus according to claim 18, wherein the at least one deposition unit has a temperature control unit for preheating powder fractions at the deposition unit.

20. The apparatus according to claim 18, wherein the temperature control unit has fluid channels for a heat transfer fluid, which are formed in a base body of the deposition unit.

21. The apparatus according to claim 18, wherein the deposition unit has a conductive base body which is connected to a reversible deposition unit voltage source.

22. The apparatus according to claim 18, wherein the actuator is a piezo actuator.

23. The apparatus according to claim 18, comprising a transfer structure for generating an electric transfer field between the deposition unit and the transfer structure.

\* \* \* \* \*